US012792586B2

(12) United States Patent
Witchey et al.

(10) Patent No.: US 12,792,586 B2
(45) **Date of Patent: *Nov. 10, 2026**

(54) LOCATION INDEXED BLOCKCHAINS, SYSTEMS AND METHOD

(71) Applicant: Nant Holdings IP, LLC, Culver City, CA (US)

(72) Inventors: Nicholas J. Witchey, Laguna Hills, CA (US); John Wiacek, Los Angeles, CA (US); Jake Fyfe, Walnut, CA (US); Patrick Soon-Shiong, Los Angeles, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/393,230

(22) Filed: Nov. 18, 2025

(65) Prior Publication Data

US 2026/0220113 A1 Jul. 30, 2026

Related U.S. Application Data

(63) Continuation of application No. 19/263,456, filed on Jul. 8, 2025, now Pat. No. 12,505,083, which is a continuation of application No. 19/041,521, filed on Jan. 30, 2025, now Pat. No. 12,393,564.

(51) Int. Cl.
*G06F 16/22* (2019.01)
*G06F 16/23* (2019.01)

(52) U.S. Cl.
CPC ...... *G06F 16/2255* (2019.01); *G06F 16/2379* (2019.01)

(58) Field of Classification Search
CPC ......................... G06F 16/2255; G06F 16/2379
See application file for complete search history.

(56) References Cited

U.S. PATENT DOCUMENTS

2018/0349968 A1* 12/2018 O'Brien ................ H04L 9/3297
2020/0356546 A1* 11/2020 Keskar .................. H04L 9/0643
2021/0182773 A1* 6/2021 Padmanabhan ...... G06Q 10/087
2021/0209681 A1* 7/2021 Mukherjee .......... G06F 21/6218

* cited by examiner

*Primary Examiner* — Charles Rones
*Assistant Examiner* — Mohammad S Bhuyan
(74) *Attorney, Agent, or Firm* — Kilpatrick Townsend & Stockton LLP

(57) ABSTRACT

Techniques include receiving, from a device, device data associated with an asset. The techniques further include determining a first index based at least in part on the device data. The techniques further include identifying a first indexed notarized ledger from a plurality of indexed notarized ledgers based at least in part on the first index. The techniques further include generating a first record associated with the asset based at least in part on the device data. The techniques further include causing a transaction to be recorded representing the first record on the first indexed notarized ledger.

20 Claims, 8 Drawing Sheets

LOCATION INDEXED BLOCKCHAINS, SYSTEMS AND METHOD

CROSS REFERENCE TO RELATED APPLICATIONS

This application is a continuation of U.S. Non-Provisional Application Ser. No. 19/263,456, filed Jul. 8, 2025 titled "Location Indexed Blockchains, Systems And Method," which is a continuation of U.S. Non-Provisional Application Ser. No. 19/041,521, filed Jan. 30, 2025 titled "Location Indexed Blockchains, Systems And Method," the contents of which are herein incorporated by reference in their entirety for all purposes.

FIELD OF THE INVENTION

The field of the invention generally relates to managing digital notarized ledgers (e.g., blockchains, distributed ledger, etc.) using a hierarchy of ledgers.

BACKGROUND

The background description includes information that may be useful in understanding the present inventive subject matter. It is not an admission that any of the information provided herein is prior art or applicant admitted prior art, or relevant to the presently claimed inventive subject matter, or that any publication specifically or implicitly referenced is prior art or applicant admitted prior art.

By way of introduction, a blockchain represents blocks or chunks of data that are linked together via cryptography technology. Each block includes, among other things, data and a cryptographic hash of at least a previous block. The cryptographic hash serves as a link to the previous block. As such, the blocks form a chain of blocks (e.g., a blockchain) linked via cryptographic hashes. The data in each block is secured (e.g., against unauthorized modifications, etc.) because any change would cause an alteration all subsequent blocks thereby indicating a modification took place. Generally, a distributed computing architecture is used to manage the blockchain. This architecture can involve multiple computer nodes. Each computer node can store a block of the blockchain, and the computer nodes implement one or more protocols to communicate and validate blocks.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the inventive subject matter and does not pose a limitation on the scope of the inventive subject matter otherwise claimed. No language in the specification should be construed as indicating any non-claimed element essential to the practice of the inventive subject matter.

Groupings of alternative elements or embodiments of the inventive subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be understood that many of the foundational technical features provided in the following specification are presented to enable compact examination of the disclosed inventive subject matter. While some of the foundational technical features described herein may seem obscure, in many cases such features may be considered within the scope of understanding of one skilled in the art. Thus, presentation of such background technologies should not be considered limiting.

SUMMARY

The inventive subject matter provides apparatuses, systems, and methods in which ledgers include a hierarchy of relationships with other ledgers. Further inventive subject matter relates to blockchains or other notarized ledgers indexed by location. A location may include a place (e.g., physical building or virtual building, file path, a network address, location in memory, etc.), an area (e.g., a one acre property, a state, etc.), a setting (e.g., a restaurant, a corporate office), and/or a position (e.g., latitude 33.9235074, longitude −118.3867642; a plus code, S2 cell identifier, etc.).

Physical locations, especially historic locations, may include plaques that describe events that took place at the location. In recent times, augmented reality or mobile technologies provide access to additional information about possible location information based on use of bar codes, AR content bound to a location, or other methods. However, such location information is not necessarily authoritative or authentic. Rather, the information is merely created as content and provided to user devices. Embodiments of the inventive subject matter disclosed herein improve on location-based services and other related services.

In an embodiment, at least one ledger is bound to a location. The ledger may record transactions (e.g., representing events, sales, rentals, a merchant inventory, a player, a player inventory, etc.) related to the location. Further, the ledger may be indexable by the location and the index may be determined using the location. In an embodiment, a computer-based data indexing system includes at least one non-transitory computer readable memory storing a plurality of notarized ledgers where each notarized ledger is indexed in the memory by at least one corresponding geographic location index and storing software instructions, and at least one processor coupled with the at least one memory, which upon execution of the software instructions, performs operations. The operations may include obtaining digital transaction data including transaction geolocation information associated with a real-world geolocation. The operations may further include generating a transaction geolocation index as a function of the transaction geolocation information. The operations may further include accessing an indexed notarized ledger stored in the at least one memory from the plurality of notarized ledgers where the geographic location index corresponding to of the indexed notarized ledger satisfies a query based on the transaction geolocation index. The operations may further include instantiating in the at least one memory a transaction record memorializing the digital transaction data with respect to the real-world geolocation. The operations may further include instantiating a ledger transaction adhering to a format of the indexed notarized ledger based on the transaction record. The operations may further include recording the ledger transaction representing the transaction record on the indexed notarized ledger in the at least one memory.

Embodiments allow information to be memorialized using a ledger (e.g., a private notarized ledger, a public notarized ledger, a distributed ledger, etc.) such that the information, and possibly the origin of the information, can be immutable so that devices can trust the information. Additionally, devices would be able to consult the ledger to see how the information has changed with time.

Various objects, features, aspects and advantages of the inventive subject matter will become more apparent from the following detailed description of preferred embodiments, along with the accompanying drawing figures in which like numerals represent like components.

DEFINITIONS

Figure 1:
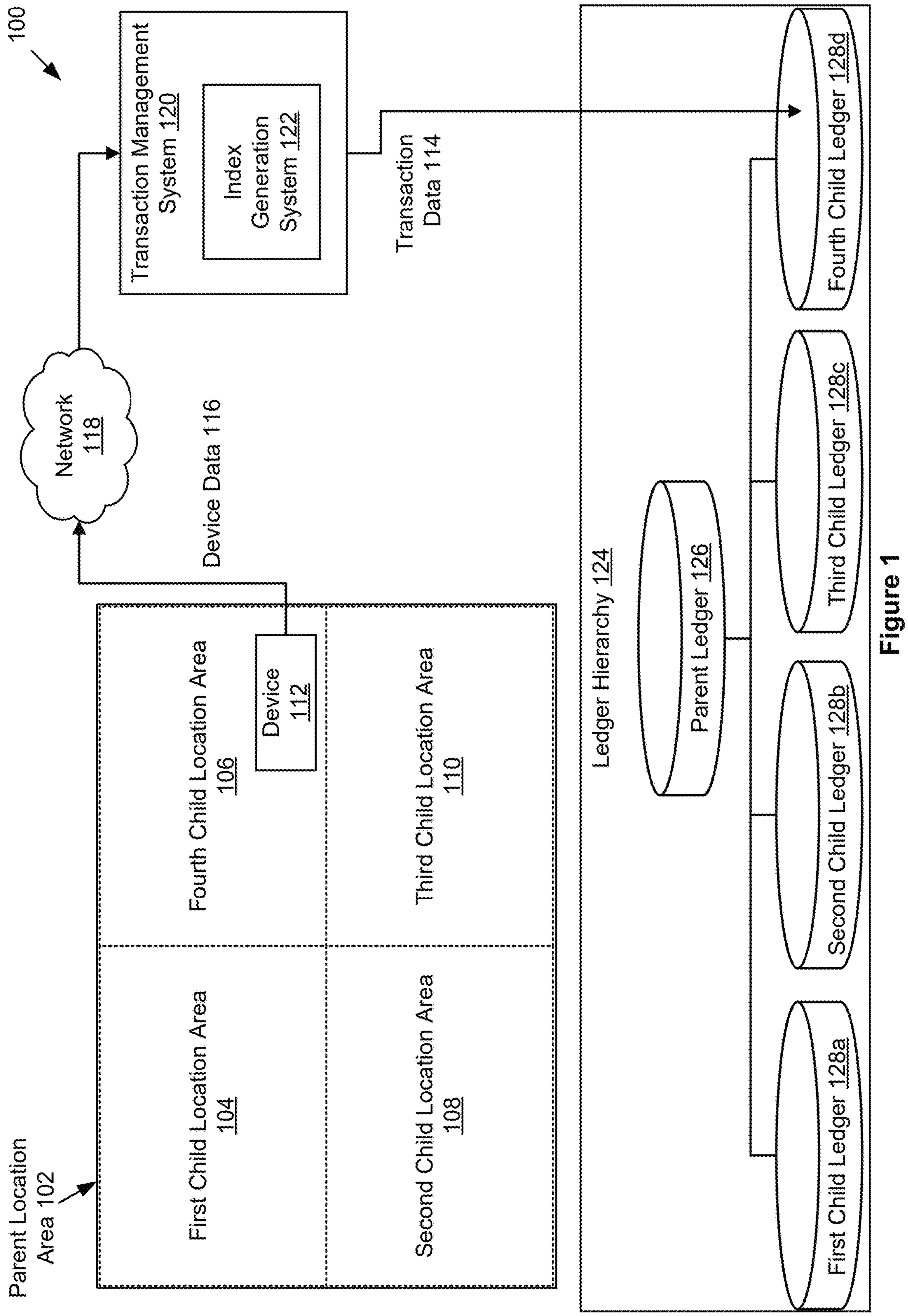
FIG. 1 illustrates a block diagram of a system according to certain embodiments, in accordance with the present disclosure.

A "blockchain" or "ledger" can be a distributed/decentralized data structure that maintains a continuously growing list of records secured from tampering and revision. A blockchain can be an NFT blockchain, a cryptocurrency blockchain, hash graph, directed acyclic graph, or a combination thereof. A blockchain may include a number of blocks of interaction records. Each block in the blockchain can include a timestamp and a link to a previous block. Stated differently, interaction records in a blockchain may be stored as a series of "blocks," or permanent files or records that include a record of a number of interactions occurring over a given period of time. Blocks may be appended to a blockchain by an appropriate node after it completes the block and the block is validated. Each block can be associated with a block header. In embodiments of the invention, a blockchain may be distributed, and a copy of the blockchain may be maintained at each full node in a verification network. Any node within the verification network may subsequently use the blockchain to verify interactions. A blockchain can be stored, maintained, and updated in a distributed manner in a peer-to-peer network. For example, in a cryptocurrency application, such as Bitcoin or Ethereum, Ripple, Dash, Litecoin, Dogecoin, zCash, Tether, Bitcoin Cash, Cardano, Stellar, EOS, NEO, NEM, Bitshares, Decred, Augur, Komodo, PIVX, Waves, Steem, Monero, Golem, Stratis, Bytecoin, Ardor, or in digital currency exchanges, such as Coinbase, Kraken, CEX. IO, Shapeshift, Poloniex, Bitstamp, Coinmama, Bisq, LocalBitcoins, Gemini and others where the distributed ledger represents each transaction and where units of the cryptocurrency are transferred between entities.

An "NFT" is a non-fungible token. NFTs serve as a unique digital identifier that is recorded on a blockchain and used to certify ownership and/or authenticity of a virtual asset or real-world asset. NFTs can be created or instantiated (i.e., typically called "minting"), bought, sold, auctioned, burned, or otherwise managed as digital objects. Management of NFTs can be achieved through use of existing of smart contracts that follow token standards such as via Ethereum smart contract standards. The Ethereum smart contract ecosystem has multiple standards by which tokens may be managed including ERC-20, which represents fungible tokens; cryptocurrency coins for example. ERC-721 defines interfaces by which one may manage NFTs via smart contracts. According to ERC-721 transactions relating to an NFT (e.g., minting, transfers, burning, etc.) are recorded on the Ethereum blockchain to retain a ledger of all desired actions associated with the NFT. Further ERC-998 defines interfaces for creating tokens comprising sub-tokens and vice versa. Yet further, ERC-1155 defines interfaces by which one can create token sets. As individuals interact with Ethereum tokens via one or more transactions, the transactions are recorded on the Ethereum blockchain thereby forming an immutable ledger of the existence of such tokens. One should appreciate that Ethereum is used as an example. Each ledger may comprise its own NFT standard interfaces via which the ledger-specific NFTs may be managed. Further, the following discussion references use of NFTs; however, use of other types of ledger-based tokens may also be leveraged with the inventive subject matter. For example, a composable token (i.e., ERC-998 like token) may represent an entire ledger-based application stack where each token (e.g., NFT, ERC-1155-like, etc.) in the composable token corresponds to a layer or feature in the stack.

A "wallet address" uniquely identifies a ledger account. Tokens can be recorded as being "stored" in the wallet of entity or person and retrieved for future use. A wallet can comprise more than one address of an account. Thus, a wallet could have multiple addresses associated with the corresponding ledger technology where each address could operate as token owner identifier. Example wallet address types include P2PKH address, P2SH address, Bech32 address, portion of a 256-bit hash, GUID, UUID, custom address (e.g., 512-bit hash, an alphanumeric string, etc.), etc.

DETAILED DESCRIPTION

The present application relates to enabling information to be memorialized on a ledger such that the information, and possibly the origin of the information, can be immutable so that devices can trust the information. Additionally, devices would be able to consult the ledger to see how the information has changed or evolved with time. The ledger on which the information is memorialized may be based on an index of the ledger in a hierarchy of ledgers. The index of the ledger may be determined based on a function, the function may depend on a location, a time, an owner of a ledger, a wallet address, game data, and/or other data received from a device.

It should be noted that any language directed to a computer should be read to include any suitable combination of computing devices, including servers, interfaces, systems, databases, agents, peers, engines, controllers, modules, or other types of computing devices operating individually or collectively. One should appreciate the computing devices comprise at least one processor configured to execute software instructions stored on a tangible, non-transitory computer-readable storage medium (e.g., hard drive, FPGA, PLA, solid state drive, RAM, flash, ROM, etc.). The software instructions or suite of software instructions configure or program the computing device or their processors to provide the roles, responsibilities, or other functionality as discussed below with respect to the disclosed apparatus or systems. Further, the disclosed technologies can be embodied as a computer program product that includes a non-transitory computer-readable medium storing the software instructions or a suite of software instructions that cause one or more processors to execute the disclosed steps associated with implementations of computer-based algorithms, processes, methods, or other instructions. In some embodiments, the various servers, systems, databases, or interfaces exchange data using standardized protocols or algorithms, possibly based on HTTP, HTTPS, TCP, UDP, FTP, SNMP, IP, AES, public-private key exchanges, web service or RESTful APIs, known financial operation protocols, or other electronic information exchanging methods. Data exchanges among devices can be conducted over a packet-switched network, the Internet, LAN, WAN, VPN, or other type of packet switched network; a circuit switched network; cell switched network; or other type of network, wired or wireless.

As used in the description herein and throughout the claims that follow, when a system, engine, server, agent, device, module, or other computing element is described as configured to perform or execute functions on data in a memory, the meaning of “configured to” or “programmed to” is defined as one or more processors or cores of the computing element being programmed by a set of software instructions stored in the memory of the computing element to execute the set of functions on target data or data objects stored in the memory. It should be appreciated the combination of software and hardware working in concert create a dedicated set of physical, real-world structures that provide utility to one or more users that would not exist outside the scope of the physical, real-world assets.

Techniques are described herein that enable digital ledgers to be indexed based on device data such as a location related to the device. Certain embodiments herein describe ledgers indexed based on a location, the index may identify a specific ledger from a set of ledgers. In the interest of clarity of explanation, a non-fungible token (NFT) is used as an example in embodiments of the present disclosure for various explanations and illustrated use cases. However, the embodiments are not limited as such and similarly and equivalently apply to other types of digital tokens. Further, the described techniques enable a parent ledger to facilitate the management of the child ledger by way of the NFT (or, similarly, the digital token).

In the following description, various embodiments of the present invention will be described. For purposes of explanation, specific configurations and details are set forth in order to provide a thorough understanding of the embodiments. However, it will also be apparent to one skilled in the art that the present invention may be practiced without the specific details. Furthermore, well-known features may be omitted or simplified in order not to obscure the embodiment being described.

Examples herein are directed to among other things, systems and methods relating to indexing ledgers (e.g., in a hierarchy of ledgers, etc.). A parent ledger may be used to manage child ledgers. Further, a transaction management system may be used to determine an index of a ledger for reading and/or for writing.

In an embodiment, at least one ledger is bound or otherwise related to a location. The ledger may record transactions (e.g., events, payments, history, interactions, etc.) related to the location. Further, the ledger may be indexable by the location and the index may be determined using the location. In an embodiment, a computer-based data indexing system includes at least one non-transitory computer readable memory storing a plurality of notarized ledgers where each notarized ledger is indexed by at least one corresponding geographic location index and storing software instructions and at least one processor coupled with the at least one memory, which upon execution of the software instructions, performs operations. The operations may include obtaining digital transaction data including transaction geolocation information associated with a real-world geolocation. The operations may further include generating a transaction geolocation index as a function of the transaction geolocation information. The operations may further include accessing an indexed notarized ledger stored in the at least one memory from the plurality of notarized ledgers where the geographic location index corresponding to the indexed notarized ledger satisfies a query based on the transaction geolocation index. The operations may further include instantiating a transaction record memorializing the digital transaction data with respect to the real-world geolocation. The operations may further include instantiating a ledger transaction adhering to a format of the indexed notarized ledger based on the transaction record. The operations may further include recording the ledger transaction representing the transaction record on the indexed notarized ledger in the at least one memory.

Embodiments described herein may provide a technologies for configuring a ledger to be indexed according to a location. The techniques for configuring indexed ledgers may further enable a ledger hierarchy to be maintained or otherwise managed. Ledgers indexed in a ledger hierarchy may enable for a ledger to be searched for and/or accessed using a ledger management system. The ledger management system may enable for a relatively fast (e.g., fast search times) and low processing operations (e.g., O(log n) logarithmic time complexity, O(1) constant time complexity, etc.) determination of an index ledger that corresponds to received data (e.g., data received from a device, data associated with an account, etc.). Ledgers indexed in a ledger hierarchy may reduce energy consumption, processing resources, networking resources, and/or memory resources (e.g., smaller memory requirements, less physical memory space being used, etc.) used by a given ledger because the ledger may include a portion of data while a different ledger (e.g., a sub-ledger, a child ledger, grandchild ledger, etc.) may include a more detailed representation of the data.

Certain embodiments may improve security and authentication compared to other systems. For example, embodiments may enhance authentication because ledgers may be accessed based on location, thereby enabling two-factor or other multi-factor authentication to occur for ledger access (e.g., in addition to consensus mechanisms, in addition to a wallet address, in addition to a token associated with a wallet address, etc.). Certain embodiments may enhance confidentiality, integrity, and/or availability of data recorded on a ledger. For example, by storing data or recording transactions in ledger hierarchies confidentiality of data may be increased as principles of least privilege may be enabled. In an example, indexing ledgers based on a location or other device data may enable data integrity to be enhanced because the data may be trusted to be accurate based on the conditions that may be implemented to access (e.g., write to, etc.) indexed ledgers. In an example, using NFTs as tokens to grant permissions to data on other indexed ledgers may enhance permission controls related to ledgers, thereby improving data integrity of the indexed ledgers.

In certain embodiments, a location based indexed ledger can reduce energy consumption, processing resources, networking resources, and/or memory resources used by the location based indexed ledgers compared to traditional ledgers. Traditional ledgers may be distributed and used to record data regardless of a location (e.g., physical real-world location, city, etc.) the data is related to and/or generated at. On the other hand, certain embodiments described herein can be configured to enable a ledger to record data that is generated at the location or otherwise related to the location. Thus, rather than a traditional blockchain that grows without limit and is duplicated among myriad nodes consuming vast amounts of computer memory, location-bound ledgers can enable more efficient use of memory thereby reducing the overall cost of management and overall need for duplicated hardware while also increasing the speed (e.g., reduce latency, etc.) by which "notarized" location-based information may be accessed.

As an example of an embodiment, consider a first ledger related to a first shop in the shopping center and a second ledger related to a second shop in the same shopping center. Such ledgers may be established for the shops to track various events associated with their respective shops such as foot traffic, number of transactions, security alerts, or other information. A customer may purchase goods from the first shop. The purchase may be represented by device data generated by and transmitted by a point of sale device location in the first shop. The device data may be transmitted to a transaction management system. The transaction management system may determine that the device data includes an indication that the purchase occurred in the first shop or involved a specific device identifier (e.g., a device identifier of the point of sale device). The transaction management system may use the device data to determine whether the device data, a subset of the device data, or data derived using the device data is to be recorded to the first ledger or the second ledger. In the example, the transaction management system may determine that a subset of the device data should be recorded on the first ledger because the purchase occurred in the first shop. The transaction management system may transmit transaction data to the first ledger. The transaction data may be generated to include the device data, a subset of the device data, and/or data derived from the device data. In the example, the transaction data may include a transaction amount, a customer identifier, a time that were each obtained from the device data.

In another example, a similar process may occur as described above and a subset of transaction data or different transaction data may be transmitted to a third ledger. The third ledger may include a ledger for the shopping center itself that the first shop and the second shop are located within. In certain embodiments, the third ledger may have permissions granted to the shopping center owner that are not granted to the shop owners. For example, the shopping center owner may be able to view the data on the third ledger to determine how business is going for the first shop, or track rent, repairs, or other information for which the shopping center owner may be interested in. The data on the third ledger may be a summary of the data included on the first ledger and/or the second ledger, which may include respective transaction data viewable by the shop owners and having further detail than the transaction data included on the third ledger.

Turning now to the figures, FIG. 1 illustrates a block diagram of a system 100 according to certain embodiments, in accordance with the present disclosure. System 100 may include a device 112, a network 118, a transaction management system 120, and one or more ledgers.

Device 112 may include a device such as a user device (e.g., a tablet, a phone, a laptop, game device, etc.), a smart device (e.g., a smart (e.g., internet connected) lamp, a smart thermostat, a smart car, a smart tractor, a smart solar panel, a smart battery pack, etc.), and/or a server. The device 112 may include zero or more user interfaces (e.g., touchscreen, keyboard, camera, etc.), zero or more sensors (e.g., accelerometer, temperature sensor, optical sensor, etc.). The device 112 may be configured to determine a location of the device 112. The location may be determined using, input received from a user interface, an optical sensor (e.g., a camera reading a barcode that corresponds to a location, a camera performing object recognition, etc.) and/or global positioning signals (GPS) signals received from another device (e.g., a satellite, wireless triangulation, vSLAM, etc.). One of ordinary skill in the art with the benefit of the present disclosure will recognize other techniques to determine a location of the device 112.

The device 112 may generate device data 116 based at least in part on receiving input from a user interface (e.g., a keyboard, mouse, touchscreen, etc.), another device (e.g., via a network 118 connection, USB, etc.), and/or one or more sensors (e.g., a motion sensor, an optical sensor, GPS sensor, accelerometer, magnetometer, hall probe, piezoelectric sensor, microphone, camera, etc.).

The device data 116 may include device information (e.g., type of device 112, software version operating on the device 112, available memory space on the device 112, hardware information, battery information, model number, build number, version information, etc.), speed information, direction information, an internet protocol (IP) address, environmental data (e.g., sound data, temperature data, optical data, etc.), and/or network data (e.g., a latency, a bandwidth, an IP address, etc.).

The device data 116 may include digital transaction data 114. Digital transaction data 114 may include data to be recorded as a transaction on a ledger (e.g., fourth child ledger 128*d*, etc.). Digital transaction data 114 may include device information such as the device 112 the transaction data 114 was generated by, when the transaction data 114 was generated, and/or what caused or triggered the transaction data 114 to be generated. Digital transaction data 114 may include transaction geolocation information associated with a real-world geolocation. The transaction geolocation information may be information generated by device 112 and/or corresponding to a location of or proximate to device 112.

The transaction geolocation information may include a latitude, a longitude, an altitude, heigh above sea level, a depth below ground or sea level, proximity to a landmark or point of interest, a distance from a point of interest, a country identifier, a state identifier, a postal code identifier, a city identifier, a building identifier, a room identifier, a stall identifier, a parking space identifier, and/or an address of a physical location, an S2 cell identifier, or other type of location identifier or data that can be mapped to a location identifier. Such location information may be a single valued data structure (e.g., an S2 cell identifier, zip code, etc.), multi-valued data structure (e.g., latitude and longitude, a street address, etc.). The transaction geolocation information may include varying levels of specificity. For example, the transaction geolocation information may include a country, state, and/or a city. Accordingly, a location may be associated with sub-locations. An example of a location with a sub location may be a country (e.g., United States, Ireland, etc.) which may include multiple states (e.g., California, Iowa, etc.) sub locations. Sub location may include sub locations of their own. For example, a state may have county or city sub locations, and still further a city may have one or more zip code locations or even neighborhood locations. One should appreciate location information may have a fine level granular detail without departing from the inventive subject matter. In more preferred embodiments, S2 cell geometries offer a high fidelity solution for generating fine grained geo-location identifiers. While terrestrial locations are discussed in the context of the technical discussion provided herein, one should appreciate that any location information may be used including lunar locations, Martian locations, space-based locations, or other non-terrestrial locations.

The digital transaction data 114 may include a timestamp and/or demographic information (e.g., demographics of a one or more users of the device 112 or a device in communication with the device 112, such as an age, a gender, etc.). The digital transaction data 114 may include information about an event that occurred in the real world such as a battle, an accident, a fire, a flood, when the event occurred, assets involved in the event.

The digital transaction data 114 may include gaming data in some interesting use cases. The gaming data may include at least one of: a game event (e.g., about a specific in-game events, such as a boss fight, a quest, or a special challenge, etc.), a game location (e.g., in-game coordinates or positions within the game world, etc.), a real-world location (e.g., the real-world location corresponds to a virtual world position, etc.), a game player (e.g., a player identifier, a character name, etc.), a goal, an attribute, a session identifier, a timestamp, a player action (an action taken by the player, such as a movement, an attacks, or a choice), player progress (e.g., information on levels completed, achievements unlocked, and milestones reached, etc.), in game purchases (e.g., details about virtual items or currency bought using in-game currency (e.g., gold, silver, etc.) and/or non-game currency (e.g., US dollars, Japanese Yen, etc.)), inventory data (e.g., information about items, equipment, and resources the player possesses, etc.), player statistics (e.g., metrics such as health, experience points, skill levels, and scores, etc.), social interactions (e.g., data on player interactions, such as chats, friend lists, and multiplayer activities, etc.), user preferences (e.g., difficulty level, control configurations, audio/visual preferences, etc.), crash reports (e.g., data on game crashes, errors, and bug reports, etc.), heat maps (e.g., visual representations of player activity and movement patterns within the game environment, etc.), time spent (e.g., duration of playtime per session, per day, cumulatively, etc.), and/or feedback and ratings (e.g., reviews, ratings, feedback on game elements, etc.).

The device data 116 may be transmitted to the transaction management system 120. The device data 116 may be transmitted to the transaction management system 120 using the network 118. One having ordinary skill in the art would recognize that data exchanges among devices can be conducted over a packet-switched network, the Internet, LAN, WAN, VPN, or other type of packet switched network; a circuit switched network; cell switched network; or other type of network, wired or wireless. That is to say, when data is sent from a device to another device (e.g., device 112 to transaction management system 120, transaction management system 120 to a ledger (e.g., a parent ledger 126, a child ledger 128, etc.), etc.), one or more other devices may necessarily be used to allow the data to travel to the destination.

The transaction management system 120 may be included in device 112, or may be remote (e.g., feet away, miles away, geographically separated, etc.) from device 112 over a network. The transaction management system 120 may be implemented as or include a smart contract on a ledger (e.g., the parent ledger, a ledger not included in the ledger hierarchy 124, etc.). Transaction management system 120 may manage transactions. Transaction management system 120 may use received device data 116 to determine a ledger and transaction data 114 to record on the ledger. Transaction management system 120 may receive device data 116 from device 112. As described above, device data 116 may include digital transaction data 114 including transaction geolocation information associated with a real-world geolocation. The device data 116 can be used by the transaction management system 120 to determine an index. The index may indicate a corresponding ledger to transmit transaction data 114 to (e.g., for recording, for using to lookup, etc.). The corresponding ledger may be a ledger for recording transaction data 114. The transaction data 114 may include at least a portion of the device data 116 and/or be determined using the device data 116.

Transaction management system 120 may include an index generation system 122. The index generation system 122 may generate an index. The index may correspond to a ledger. The index may represent a geolocation. The index may represent a geolocation of the device 112. The index may be the geolocation itself, derived from the geolocation via one or more functions, found via a lookup table, or through use of other suitable techniques. For example, a cell phones geo-location coordinates (i.e., latitude and longitude) may be converted to single valued S2 cell identifier via an API call to an S2 cell geometry library.

The index may be generated using the device data 116 (e.g., including transaction physical geolocation information, including transaction virtual geolocation information, etc.). The index may be generated as a function of the device data 116 (e.g., using a portion of the device data 116, using all of the device data 116, using the device data 116 in combination with other data, etc.). The function may include a mapping function. The output of the function may be based at least in part on the device data 116 (e.g., a first portion of the device data 116 and/or a second portion of the device data 116, etc.), a timestamp, previously received device data 116 (e.g., from device 112 and/or another device, etc.).

In certain embodiments, the function may include a lookup function (e.g., to lookup a set of one or more values in a database and/or lookup table, etc.). In certain embodiments, the function includes a hash function. The hash function may use the device data 116 as input and generate a hash value that is an index as output. In certain embodiments, the hash function is used to generate a hash value that is used to determine (e.g., using the hash value with a lookup table, using the hash value as input to a function, etc.) an index corresponding to the output value. In certain embodiments, the hash value may be compared to a set of values associated with an index to determine which value associated with an index is most similar to the hash value, and the hash value is determined to indicate the index based on the closest similarity.

As an example, the device data 116 may indicate geolocation information which may indicate the device 112 is located in the second child location area 108 (e.g., a specific state, a defined geofence, sub-area, etc.) and the index generation system 122 may use the device data 116 to determine an index. The index generation system 122 may output the determined index. The determined index may correspond to or otherwise point to a ledger (e.g., the fourth child ledger 128*d*, etc.). In the illustrated example, the fourth child ledger 128*d* may correspond to the second child location area 108. In certain embodiments, the hash function may include a Fast64 hash function to generate a 64 bit hash value.

The index may include at least one S2 cell identifier, a postal code, a postal code identifier, a state identifier, a country identifier, a geofence identifier, a plus code, a parking space identifier, a building identifier, an arena identifier, a park identifier, a landmark identifier or point of interest identifier, a city identifier, a room identifier, a stall identifier, or other identifier that may map to a physical real-world location. Still, it is completed the index may point to a virtual location, possibly in a virtual game world for example. In certain embodiments, the index may include an identifier of a device (e.g., a device associated with a transaction, etc.) and/or a user account (e.g., a user account associated with a transaction, etc.).

An index generated based on a location (e.g., a location of the device 112, a location for a transaction, a location of a receiving device (e.g., a device receiving an NFT from the device 112, a device receiving a token from the device 112, etc.), etc.) may be referred to as a transaction geolocation index. The index may correspond to an index in a data structure such as a tree (e.g., a quad tree, a binary tree, a B tree, Trie, etc.) where the tree maps to physical locations, a lookup table, a hash map, etc. The index can be used with the data structure to determine a ledger included in the ledger hierarchy 124 that corresponds to the index.

The transaction management system 120 may use the index determined by the index generation system 122 to determine a ledger from among many location-indexed ledgers to record transaction data 114 on. As described above, the index may correspond (e.g., as represented by a lookup table, a tree structure, or other data structure, etc.) with a ledger identifier or may include a ledger identifier. Transaction management system 120 may access (e.g., communicate with, record to, etc.) a ledger corresponding to the index (e.g., an indexed notarized ledger, etc.).

In certain embodiments, the transaction management system 120 may transmit transaction data 114 to a ledger corresponding to the index (e.g., corresponding in an index-to-ledger lookup table used to query a ledger identifier). In certain embodiments, the index and/or transaction management system 120 includes information about a node of a blockchain corresponding to the index. The transaction management system 120 may transmit transaction data 114 to the node to be recorded on the ledger the node maintains. The node may be indicated by the index or determined using the index. In certain embodiments, the index and/or transaction management system 120 includes information about a ledger block and/or an IP address to which the transaction data 114 is transmitted.

In certain embodiments, the transaction generation system may generate more than one index using device data 116 (e.g., using a function or more than one function, a location-to-index mapping function, etc.). For example, the transaction management system 120 may record first transaction data to a parent ledger 126 and second transaction data to a child ledger 128 (e.g., in the ledger hierarchy 124). The first transaction data may be different than the second transaction data. The first transaction data may include a portion of the second transaction data or an indication of information included in the second transaction data.

In an example, the transaction management system 120 may record first transaction data to one or more ledgers (e.g., in the ledger hierarchy 124) indexed by location and record second transaction data to one or more different ledgers (e.g., in a different ledger hierarchy, among linked ledgers, etc.). Such embodiments may be useful when different transaction data can be determined from the device data 116 and used to record transaction data of different scopes on multiple ledgers. In one example, device data may include transaction information for a transaction that occurred in a shop of a shopping center. The transaction management system may generate first transaction data based on the device data and transmit the first transaction data to a first ledger that records transaction information in detail, such as transaction time, transaction value, and items purchased. The first ledger reflect the detailed sale information that occurred in the shop. The transaction management system may generate second transaction data based on the device data and transmit the second transaction data to a second ledger that records transaction information in a different level of detail than the first ledger. For example, the transaction data may include the transaction value and an identifier of the shop. The second ledger may reflect revenue for the shops in the shopping center. While shopping centers provide for a illustrative example, one should appreciate that other types of venues are also contemplated. For example, a sporting arena may have one or more ledgers corresponding to different event types (e.g., a football game, a baseball game, a truck pull, a convention, etc.). Thus, each ledger may be found based on the sporting arena's geo-location and each ledger may be found based on type. Further each ledger may record events that take place at the area, but only associated with the corresponding event type.

The transaction data 114 may include the device data 116, a portion of the device data 116, data determined using the device data 116, node information (e.g., a node uniform resource locator (URL), URI, etc.), a signature (e.g., a signature of the device 112, a signature of the transaction management system 120, etc.), an instruction (e.g., a burn instruction, a mint instruction, a transfer instruction, etc.), a value (e.g., 1 ETH, 0.1 BTC, 5 USDC, 10 SOL, fiat currency value, etc.), and/or a wallet address (e.g., a wallet address of a receiver, a wallet address of the sender), etc.

The ledger the transaction management system 120 accesses (e.g., transmits data to, transmits transaction data to, etc.) may be recorded on a set of one or more ledgers. The one or more ledgers may include a ledger hierarchy 124. The ledger hierarchy 124 may include ledgers with parent-child hierarchy relationships. The illustrated example shows that the ledger hierarchy 124 may include a parent ledger 126 and any number of child ledgers 128. The parent ledger 126 may itself have a child relationship to a parent ledger of the parent ledger 126. One should appreciate that other forms of ledger organizations are also contemplated. For example, rather than or in addition to a ledger hierarchy, multiple ledgers may be linked or crossed linked with each other forming a network of ledgers where each ledger may be a node in the ledger network. In such embodiments, a ledger name service may be implemented that maps a ledger's name to actual ledger's location. Such a name service may convert a name of a ledger to a geo-location index, which in turn would point to the target ledger. Such names may be hierarchical in nature. For example, a ledger name such as USA. CA. OC. LAGUNAHILLS may point the ledger corresponding to the town of Laguna Hills, in Orange County, California, in the USA. This name could be resolved to a coordinate (e.g., 33.61321533228386, −117.71173859184358) or an S2 cell identifier, for example, that could then be used to lookup the corresponding ledger.

The set of ledgers may include one or more of the following types of ledgers: a blockchain, a hashgraph, a directed acyclic graph, a distributed ledger, a private ledger, a semi-public ledger, etc. A ledger in the set of ledgers may be configured according to a different protocol than another ledger in the set of ledgers. For example, the first child ledger 128*a* may be configured according to an Ethereum protocol and the second child ledger 128*b* may be configured according to a Solana protocol. Other protocols may include a protocol for a hashgraph, a directed acyclic graph (DAG), a linked list, or a distributed ledger.

A ledger in the set of ledgers may be associated with a location (e.g., a state, a postal code, a parking space, a room, a geofenced area, an S2 cell, a property boundary, etc.). Ledgers in the set of ledgers may be associated with different locations and/or more granular locations. For example, a parent ledger 126 may be associated with a state, and a first child ledger 128*a* may be associated with a city. In another example, parent ledger 126 may be associated with a city and the first child ledger 128*a* may be associated with a parking lot. Additionally, the first child ledger 128*a* may itself be a parent ledger to a different child ledger that is associated with a parking spot in the parking lot associated with the first child ledger 128*a*. In certain embodiments, the location (e.g., area, position, etc.) associated with a first ledger may overlap with a second location associated with a second ledger. A ledger corresponding to a parking space may be used to record transactions related to an owner of the parking space, who parks at the parking space, how long someone was parked at a parking space, rent for the parking space, payments for use, and/or reserving the parking space, etc. While the main examples provide for using locations of area, one should appreciate that a location could also be a volume or a set of volumes. For example, a ledger may be bound to a volume represented by a tall building's location and a set of floors of the building. Thus, depending on the number of floors in the tall building, there may be multiple volumes of interest at a single location, each volume bound to the building's location, but also bound to different volumes. Therefore, ledgers may be bound to elevation or altitude as well as location. Such elevations may be positive (e.g., above sea level, above a reference height, etc.) or negative (e.g., below sea level, below a reference height, etc.).

The illustrated system 100 shows that the parent ledger 126 may be associated with the parent location area 102. The parent location area 102 may correspond to a physical area (e.g., a city in the real world, a country in the real world, etc.). In certain embodiment, a location area may correspond to a virtual location area (e.g., a location area in a virtual world, a location area in a realm of a virtual world, etc.). The first child ledger 128*a* may be associated with first child location area 104. The first child location area 104 may be a subset of the area covered by the parent location area 102. The subset of the area may be a smaller area than the parent location area 102 and within the parent location area 102. Similarly, the second child location area 108, third child location area 110, and fourth child location area 106 may be a subset of the parent location area 102 and may each correspond to a second child ledger 128*b*, a third child ledger 128*c*, and a fourth child ledger 128*d*, respectively.

Although not illustrated, the child locations areas may overlap. For example, first child location area 104 may include area in common with second child location area 108. Although not illustrated, in certain embodiments, the parent location area 102 may include portions of the area that are not covered by a child location area.

In certain embodiments, a ledger may include more than one parent ledger 126. In certain embodiment, the child location area may remain the same size over time but may change location relative to other child location areas over time. For example, the child location area may correspond to a car and the car may move around a city that corresponds to the parent location area 102 over time.

The first child ledger 128*a*, second child ledger 128*b*, third child ledger 128*c*, and fourth child ledger 128*d* may be included in a ledger cluster. The ledger cluster may include two or more ledgers with a common parent ledger 126. The ledger cluster may include ledgers associated with a common index type (e.g., a geolocation index, a device index, a network address index, etc.), owner index, and/or other type of index. The ledger cluster may include ledgers associated with a common location, device, network address, use, and/or ledger hierarchy 124 level. As previously discussed a sporting arena's location may have multiple ledgers forming a cluster where each ledger corresponding to a type of event hosted at the area.

Once the transaction data 114 is transmitted to a ledger from the transaction management system 120, a transaction record may be instantiated in a device memory (e.g., device 112, transaction management system 120, a network device, etc.) or other computer readable storage; the memory of transaction management system 120 for example. In some embodiments, the instantiated transaction record may be stored on the target ledger or another ledger, while in other scenarios the instantiated record may be created in an off-ledger storage location. The transaction may memorialize the transaction data 114 by transmitting the transaction data toon the ledger the transaction data 114 is transmitted to. For example, the transaction data may memorialize the transaction data 114 from device 112 in the fourth child location area 106 associated with a real-world geolocation on the ledger the transaction data 114 is transmitted to. In certain embodiments, the transaction record memorializes the transaction data 114 with respect to a real-world geolocation. For example, the fourth child ledger 128*d* can memorialize transaction data 114 associated with the fourth child location area 106.

A ledger transaction may be instantiated using the transaction data 114 and with a format consistent with other transactions included in the transaction record maintained by the ledger. The ledger transaction may include a fungible token (e.g., a token that is divisible and not unique, BTC, ETH, etc.) transaction, a composable token (e.g., a token that includes one or more other tokens, etc.) transaction, a collection token (e.g., a token that groups two or more tokens together, etc.) transaction, a non-fungible token (NFT) (e.g., a token that cannot be copied, substituted, or divided) transaction. The ledger transaction may include a minting transaction, a transfer transaction, a purchase transaction, a vote transaction, a sale transaction, a burn transaction, a copy transaction (e.g., copying a ledger to another ledger, to different computer readable memory, etc.), a smart contract deployment transaction, or smart contract interaction transaction. The ledger transaction may include generation of a genesis block of a ledger (e.g., the ledger on which the transaction is recorded).

The ledger transaction may include an index of the transaction and/or an index of a block the transaction is included in. The ledger transaction may include a transaction hash to uniquely identify the content of the transaction, a sender address (e.g., a wallet address associated with device 112, a wallet address of the sender, etc.) for the wallet that initiated the transaction, a recipient address (e.g., a wallet address to be a recipient of a transaction), an amount, a fee, a data field and/or an event field. The data field may include information relevant to the transaction. When sending cryptocurrency it could include a message for the receiver, if deploying a smart contract it can include the code of the contract, and when transacting with a smart contract it can include details of the function invoked on the contract. The event field may include information about data output by a smart contract in a transaction.

In certain embodiments, the ledgers included in the ledger hierarchy 124 may be located at a common location or set of locations. In certain embodiments where the ledgers included in the ledger hierarchy 124 correspond to physical locations, ledgers may be stored in memory within proximity (e.g., within the bounds of, within a predefined distance, etc.) to the physical locations the ledgers correspond with. The location of memories a ledger is stored on may be determined based on whether the memories share a chassis, share a racks, are in proximity to one another, share a power source, share a network (e.g., local access network), and/or failure domains. In other embodiments, ledgers may be stored outside or remote from their corresponding physical or real-world locations.

An example ledger hierarchy 124 may include a hierarchy of an organizational structure including a corporation ledger including division child ledgers. The division ledgers including department child ledgers. The department ledgers including team child ledgers. The team ledgers including employee child ledgers. Such ledgers may be useful to record contributions of different parts of an organization. The different portions of the organization may be indexed based on location of the division, department, etc. and/or the organizational unit.

For example, a device may transmit device data to a transaction management system. The device data may include a device identifier, a device owner identifier, a user identifier, a network address, a department identifier, a file, a location identifier, and/or a credential received from the device. The transaction management system may determine that the device data is associated with at least a first ledger for a first department. For example, a file may have been accessed by a user identified by a first user identifier. The transaction management system may determine that the user identifier is associated with the first department. A record of the file access may be stored on the first ledger so that the first ledger can record actions performed by users assigned to the first department. A parent ledger of the department ledger may be a first organizational unit ledger. The organizational unit ledger may record state information of the first ledger and any number of other department ledgers. The organizational unit ledger may record user identifiers assigned to each department and keep track of their respective file access events, or other access events such as building access events (e.g., to track productivity, to track attendance). Such a ledger hierarchy may be useful so that the organization unit ledger can track higher level access information than the access information maintained by the department ledger.

An example ledger hierarchy 124 may include a hierarchy of an legal system including a supreme court ledger including appellate court child ledgers. The appellate ledgers including trial court child ledgers. The trial court ledgers including specialized court (e.g., family court, small claims court, etc.) child ledgers. Such ledgers may be useful to record a history of litigation, rulings, court appearances, sitting judges, clerks, and/or courtroom officers, filed documents appeals from one court to a higher courts, etc. The ledgers may be indexed based on a court system or their jurisdictions.

For example, court appearance information including a counsel identifier, a time, and a location may be included in device data transmitted to a transaction management system. The transaction management system may use the court appearance information to determine that the court appearance information should be recorded on a ledger corresponding to the type of court (e.g., family law) that was in session at the time and place represented by the court appearance information.

In another example, a child ledger may be used to store first rulings and first related information for district court cases and the parent ledger may be used to store second rulings and second related information for appellate court cases. The appellate court cases may have originated from a court associated with the child ledger. The parent ledger associated with the appellate court may include a NFT that points to the child ledger. The NFT may represent the ruling or other case information.

An example ledger hierarchy 124 may include a hierarchy of an educational system including a school district ledger including school child ledgers. The school ledgers including grade child ledgers. The grade ledgers including class child ledgers. The class ledgers including student child ledgers. Such ledgers may be indexed based on location and/or based on an account classification such as a student, teacher, administrator, etc. In an example, student laptop devices transmit activity data to the transaction management system as device data. The transaction management system can determine a classroom that the student is located in at the time the device data is transmitted. For example, the transaction management system may cross reference a student schedule with a student identifier included in the device data to determine a classroom the student is in, or should be in. The transaction management system may maintain a mapping of which classrooms correspond to which student identifiers based on the time of day (e.g., at 8 AM student A is in classroom A, at 10 AM student A is in classroom B, etc.). The transaction management system may transmit the activity data to a ledger associated with the classroom. A teacher of the student may be able to view the activity data recorded on the classroom ledger to monitor student learning. Certain activity data, such as test grades, may be additionally transmitted to a school ledger. Activity data of the teacher may be included in device data and transmitted to the transaction management system for the transaction management system to then record the activity data on the school ledger. In a school environment, the hierarchy of ledgers may also be useful for tracking substitute teachers being used throughout a school district, visitors, and/or sickness, etc.

An example ledger hierarchy 124 may include a hierarchy of file system including a root directory ledger including subdirectory child ledgers. The subdirectory ledgers including folder child ledgers. The folder ledgers including subfolder child ledgers and/or file child ledgers. The subfolder ledgers including file child ledgers. The ledgers may be useful to track memory of a file system over time, document history, application information, documents assigned to profiles, etc. The ledgers may be indexed based on a file path, also referred to as a file location. In some scenarios such a ledger hierarchy may be useful for tracking how memory was used and/or what occupied memory at a certain part of a file path/file directory. When a file or other data in a file path is added, removed, or edited, the ledgers at a corresponding index may be updated to reflect the file or other data being added, removed, or edited. Such a ledger hierarchy may be useful to show incremental changes to files and/or applications over time. This may be useful to roll back changes, determine contributions, and/or perform validation checks on applications to ensure that the application has not been changed without authorization.

An example ledger hierarchy 124 may include a hierarchy of a products including a main product category (e.g., electronics, etc.) ledger including subcategory (e.g., smart watches, smart phones, etc.) child ledgers. The subcategory ledgers including brand child ledgers. The brand ledgers including specific product child ledgers. Such ledgers may be useful to enable tracking of product catalogs over time, sales, discounts, reviews, and/or recalls. The ledgers may be indexed based on product information. When a product is added to a online catalog, product information may be included in device data. The device data may include a virtual location of where the product is being added, such as Retailer>Electronics>Phones. The virtual location may be used to add transaction data to one or more of a retailer ledger, an electronics ledger, and/or a phones ledger with product data.

An example ledger hierarchy 124 may include a hierarchy of software including a system ledger including subsystem child ledgers. The subsystem ledgers including module child ledgers. The module ledgers including component child ledgers. The component ledgers including function child ledgers. Such ledgers may be useful to enable software development over time. The ledgers may be indexed based on a file path. When an addition, change, or deletion of code is performed, the virtual location of the code may be used to record how the code was changed. The virtual location may be indexed based on the Software Application>Subsystem>Module>Component. The virtual location may be used to add transaction data to one or more of the software application, the subsystem, the module, or the component ledgers to reflect a software development action performed. Thus, in some embodiments, the inventive subject matter of location-based ledgers may be integrated into version control systems (e.g., Git, BitBucket, Mercurial, Perforce, etc.) where the ledger records what changes occurred to the code and which location caused the change.

An example ledger hierarchy 124 may include a hierarchy of a military structure including an army ledger including subsystem corps ledgers. The corps ledgers including division child ledgers. The division ledgers including brigade child ledgers. The brigade ledgers including battalion child ledgers. The battalion ledgers including company child ledgers. The company ledgers including platoon child ledgers, etc. The ledgers may be useful to track make up of groups of those enlisted, where devices associated with users of a given status have been located, rank changes, jobs, etc. The ledgers may be indexed based on rank. As an example, when a room is being accessed by a device such as a near field communication badge, a device reader may transmit device data to a transaction management system. The device data may include a user identifier. The transaction management system can record the access attempt to one or more ledgers based on the rank of the user.

An example ledger hierarchy 124 may include a hierarchy of a government including a federal government ledger including state government child ledgers. The state government ledgers including county government child ledgers. The county government ledgers including city government child ledgers. The city government ledgers including municipality child ledgers. Such ledgers may be useful to enable tracking of personal, regulations, and laws over time. The ledgers may be indexed by government level, for example, a government level associated with device data. As an example, when a law or regulation is enacted, it may be recorded on a ledger based on a jurisdiction that the law can be enforced. A local regulation may be recorded within a federal>state>local ledger hierarchy such that is recorded on the local ledger.

An example ledger hierarchy 124 may include a hierarchy of an information technology infrastructure including a data center ledger including subsystem server child ledgers. The server ledgers including virtual machine child ledgers. The virtual machine ledgers including application child ledgers. The application ledgers including service child ledgers. The hierarchy of ledgers can be used to track device data associated with a virtual location, the virtual location corresponding to a service, an application, a virtual machine, etc.

An example ledger hierarchy 124 may include a hierarchy of a supply chain including a supplier ledger including manufacturer child ledgers. The manufacturer ledgers including distributor child ledgers. The distributor ledgers including retailer child ledgers. The retailer ledgers including customer child ledgers. In certain embodiments, a ledger may be instantiated and correspond to production during a specific time period, for a specific purchasing entity, and/or at a specific facility. The ledgers may be indexed by product or category of products. The hierarchy of ledgers can be used to track how products have been received and distributed by different parts of a supply chain.

An example ledger hierarchy 124 may include a hierarchy of academic disciplines including a discipline ledger including dub-discipline child ledgers. The sub-discipline ledgers including field child ledgers. The field ledgers including specialization child ledgers.

An example ledger hierarchy 124 may include a hierarchy of ledgers for project management including a portfolio ledger including program child ledgers. The program ledgers including project child ledgers. The project ledgers including task child ledgers. The task ledgers including subtask child ledgers. The ledgers may be indexed based on a client, a project manager, a year, a project, and/or a location.

An example ledger hierarchy 124 may include a hierarchy of ledgers for an amusement park including attraction (e.g., ride, games, food, etc.) child ledgers. The ledgers may be indexed based on location as described in other embodiments herein.

In certain embodiments, a hierarchy of ledgers may include ledgers corresponding to rental properties, mortgaged properties, taxable assets, food trucks, reservations, rooms in a medical facility, etc. The ledgers may be indexed based on a location and/or a type of asset.

An example ledger hierarchy 124 may include a hierarchy of a documents including a library ledger including documents child ledgers. The documents ledgers including book, magazine, and/or video child ledgers. The book, magazine, and/or video ledgers including title child ledgers. The title ledgers including chapter child ledgers.

An example ledger hierarchy 124 may include a hierarchy of ledgers for corporate governance including a board of directors ledger including executive management child ledgers. The executive management ledgers including middle management child ledgers. The middle management ledgers including operational staff child ledgers. The task ledgers including subtask child ledgers. Such a hierarchy of ledgers may be useful to enable access control to information in the ledger hierarchy 124. The transaction management system 120 may be configured to enable read and/or write access from/to ledgers based on the device 112 being used and/or a user associated with the device 112. Such a hierarchy of ledgers may be used for auditing of a corporation.

In certain embodiments, the index generation system 122 may receive device data (e.g., an image, a video, audio, etc.) and use the device data to determine a descriptor of the device data. The descriptor may be generated using a machine learning model. For example, the machine learning model may include an image-to-text machine learning model (e.g., a Bootstrapping Language-Image Pretraining (BLIP) model, an optical character recognition (OCR) model, etc.). The image-to-text machine learning model may generate a description of the image. The description may include an index or be used to determine an index (e.g., using techniques described above such as hashing). In certain embodiments, the device data may be input into a large language model (LLM) alongside a predefined prompt that causes an identifier to be determined. The identifier may correspond to a ledger and can be used to access the ledger. The identifier may include the index.

In certain embodiments, NFTs can be used to provide functionality other than representing ownership of an asset. In certain embodiments, NFTs can operate as a security token, enabling a device associated with the owner address to read to, write to, and/or edit one or more child ledgers and/or parent ledgers. In an example use case, when the device 112 is located in the parent location area 102, the device 112 may be capable of causing the parent ledger 126 to be accessed (e.g., writing data and/or reading data to and/or from the parent ledger 126, etc.). A wallet address associated with the device 112 may be associated with an NFT. For example, the NFT may be owned and/or managed by the wallet address. The NFT may operate as a security token, enabling the device 112 to access one or more child ledgers 128 of the parent ledger 126 when the device 112 is located in a corresponding location area. For example, the device 112 may be located in the fourth child location area 106 and the NFT may enable the device 112 associated with the wallet address to access the fourth child ledger 128*d*. In certain embodiments, the NFT is burned when the device 112 leaves the parent location area 102 and/or the fourth child location area 106. In certain embodiments, the NFT is burned a certain amount of time after the device 112 leaves the parent location area 102 and/or the fourth child location area 106 without returning. In certain embodiments, a ledger corresponding to a location area may not be accessed until one or more NFTs have been obtained.

In certain embodiments, a ledger corresponding to a location area may not be accessed until the device 112 has been located in one or more of the other location areas. For example, the fourth child ledger 128*d* may not be accessed by a wallet associated with the device 112 if the device 112 has not first recorded a transaction on the third child ledger 128*c* and/or the parent ledger 126 indicating the device has been located within the third child location area 110. The location areas that the device 112 has been located in and other information about the location (e.g., how long the device 112 was located in the area, a speed of the device 112, etc.) may be stored on one or more ledgers associate with the respective area. For example, the parent ledger 126 corresponding to the parent location area 102 may record transactions and/or NFTs that indicate locations of the device 112 over time. Thus, tracking a device's movement in or through various areas and the device's interactions with corresponding ledgers may be used to give rise to additional utility. In some scenarios such tracking may be used for security purposes where the device must have a specific set of movements and/or interactions to unlock access to additional ledgers. Further, such techniques may be used for location-based mobile games where the movements and/or interactions unlock content. Thus, a person or other entity (e.g., robot, etc.) may need to perform a certain choreography before access is granted to the additional ledgers. Therefore another aspect of the inventive subject matter includes defining such choreography or location-based paths for security purposes and binding to the corresponding ledgers.

In an example use case, the ledger hierarchy 124 may be indexed based on a network location. In such a use case, the fourth child location area 106 may represent a subnet and the parent location area 102 may represent a network that includes the subset and zero or more other subnets. The parent ledger 126 for the network may be used to assign admin rights to subnets, record high level network traffic, grant network access permissions, etc. As an example, the network access permissions can be granted via ownership of an NFT. Device data 116 generated from within the subnet may be recorded on the fourth child ledger 128*d* that is associated with the fourth child location area 106. The ledger hierarchy 124 may be indexed based on addresses (e.g., a sender address and/or receiver address, etc.) included in packets transmitted by the device 112 and/or received by the device 112. The ledger hierarchy 124 may be used to track network activity and can be used to perform log analysis in the case of a network security breach and/or to detect suspicious activity. In certain embodiments, a network address (e.g., MAC address, IP address, URL, URI, DOI, HOI (see U.S. Pat. No. 11,017,897) etc.) may be used for indexing the ledger hierarchy 124.

In an example use case, the ledger hierarchy 124 may correspond to virtual locations areas and a virtual character may be located a virtual location area (e.g., a virtual fourth child location area 106). For example, the parent ledger 126 may record transaction data 114 related to a virtual land parent location area 102 in a game (e.g., a video game, an AR game, a VR game, etc.) and the fourth child ledger 128*d* may record transaction data 114 related to actions performed by the virtual character in the fourth child location area 106. The fourth child location area 106 may represent a merchant (e.g., stationary, non-stationary, caravan, shop, traveling merchant, etc.) in the game, player housing, a dungeon, a battleground, a zone of a virtual world, etc. In certain embodiments, the fourth child location area 106 is an area around an NPC and the NPC may move around a virtual world. The ledger hierarchy 124 may be indexed based a virtual location in addition to, or as an alternative to, a location of device 112. The virtual location of the player may be transmitted to the transaction management system to determine one or more ledgers in the ledger hierarchy 124 to access.

In an example use case, the ledger hierarchy 124 may include a parent ledger 126 for a building and child ledgers 128 for floor of the building. The child ledgers 128 may record transaction data that relates to construction, maintenance, blueprints. The parent ledger 126 may include NFTs that point to the child ledgers 128. In certain embodiments, an NFT is owned by a wallet address that corresponds to an owner of a business occupying the floor of the building. A managing device of the building may be enabled to monitor a subset of activities occurring on each floor's ledger. The ledgers may be indexed by floor. The parent ledger 126 may include a set of NFTs that have identifiers that serve as the index generation system 122. For example, if the building includes twenty floors, the parent ledger 126 may include NFTs with identifiers 1-20. NFTs may be minted and burned when floors are added or removed. The NFTs may point to respective child ledgers 128 and therefore may serve as a lookup table and the index generation system 122. Such an indexing system may be hierarchical in nature. For example, an indexing structure could include a building identifier (e.g., BLDG1) and floor identifier (e.g., F1, F2, B1, B2, etc.) and say an apartment identifier (e.g., A123, A567, etc.). Thus, an index might be of the for "BLD1.F5.A510." Such an approach is advantageous because each portion of the address may point to different ledger. The BLD1 portion would represent the index for the parent ledger for the building. The BLD1.F5 (floor 5 of building 1) would point to the floor-specific child ledger of the building ledger, and the BLD1.F5.A510 would point to apartment 510's ledger which would be a child of the floor ledger.

In an example use case, the ledger hierarchy 124 may include a biological location. For example, a biological location may include a heart, a lung, a right hand pointer finger, a torso, an ulna, etc. The ledgers may be indexed based on the biological location. Each ledger may record transaction data associated with the biological location (e.g., a vaccine, a diagnosis, symptoms, surgery, donors, etc.). The ledgers may be indexed based on the biological location. Still further, ledger may be indexed based on familial relationships. A father might have a ledger that includes pointers to a son or daughter, which may further have ledgers pointing to a grandchild ledgers. Thus, ledgers can form a family hierarchy of ledgers.

In an example use case, location of objects on a movie set may be used to index the ledger hierarchy 124. For example, the device data 116 may include location data for one or more object on a movie set. The location on the movie set may correspond to a parent location area (e.g., the parent location area 102) and/or a child location area (e.g., the fourth child location area 106). The device data 116 including the location data for the one or more object on a movie set may be used to record object position data over the course of filming a movie. The object positions may be recorded so sets can be reproduced subsequently. Object positions may include props, people, cameras, backdrops, images on a screen backdrop, etc.

Figure 2:
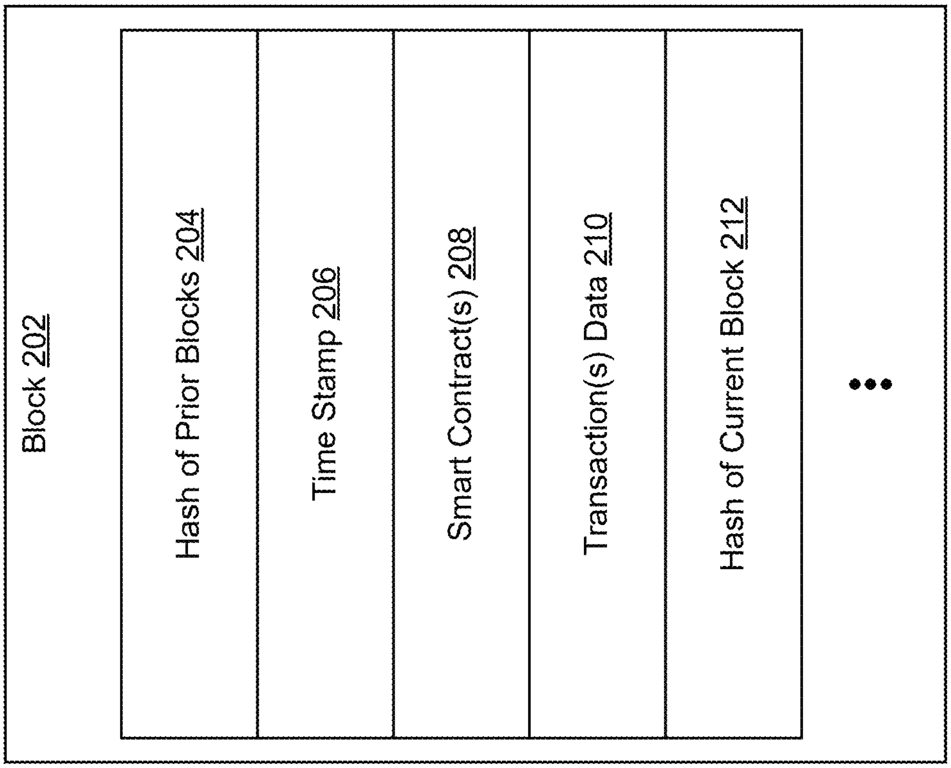
FIG. 2 illustrates a block diagram of a blockchain block according to certain embodiments, in accordance with the present disclosure.

FIG. 2 illustrates a block diagram of a blockchain block according to certain embodiments, in accordance with the present disclosure.

Blockchains, or notarized ledgers, are comprised of structured data that are called blocks. A block 202 may include a cryptographic hash (a unique identifier) of the previous block 204 to prevent any block from being altered or the sequence of blocks from being altered. A blockchain is essentially a write-once-at-the-current-block, read-many-blocks type of system. A block 202 can be written to the blockchain, but it may then only be read from, it cannot be altered and preferably represent immutable data. A block 202 may also include a time stamp 206 of when transactions were recorded. Each block 202 may further include a hash of the current block 212, representing the hash value of the block 202 after the block 202 has obtained a batch of one or more valid transactions to be included within the block 202 on the blockchain. Additionally, a block 202 may represent other data such as smart contracts 208 or transaction data 210. A block 202 may include zero or more transactions represented as transaction data 210. Additionally, or alternatively, a block 202 may represent zero or more smart contracts 208. In certain embodiments, the number of transactions (represented by transaction data 210) and/or smart contracts 208 that may be associated with block 202 may be limited by the amount of time a block 202 takes to be validated by the network. Further, transaction data 210 in a block 202 may include high level information about the transaction such as that the transaction was a minting transaction, a ledger-to-ledger transaction, a copy transaction, a burn transaction, an ownership transaction, a transfer transaction, a purchase transaction, a vote transaction, a sale transaction, a smart contract deployment transaction, or smart contract interaction transaction, etc. On the other hand, transaction data 210 in a block 202 may be more specific such as that an NFT transferred ownership or what the NFT data represents. In certain embodiments, transaction data 210 of a first size is stored on the blockchain while at least a portion of the transaction data of a second size is stored off of the blockchain because of the attributes the data has (e.g., data size, transaction type, etc.) might not be practical to store on-ledger. In certain embodiments, high-level transaction data 210 is stored on the blockchain and the high-level transaction data 210 includes a pointer (e.g., URI, URI, DOI, HOI, link, filename and path, etc.) to where the lower-level data is stored (e.g., where the off-chain storage is, IPFS, etc.) off-ledger.

Figure 3:
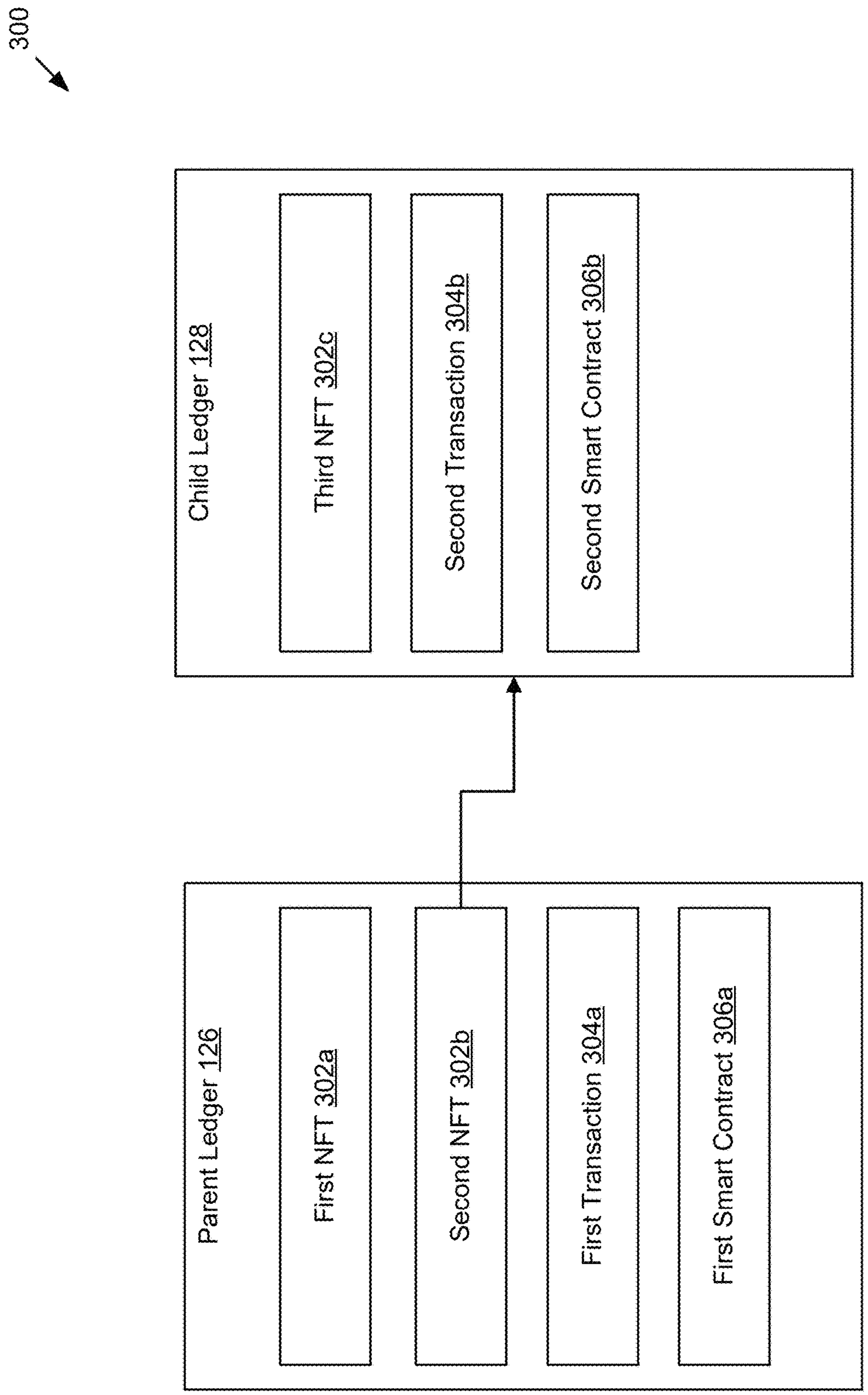
FIG. 3 illustrates a block diagram of a parent ledger and a child ledger according to certain embodiments, in accordance with the present disclosure.

FIG. 3 illustrates a block diagram 300 of a parent ledger 126 and a child ledger 128 according to certain embodiments, in accordance with the present disclosure. The parent ledger 126 may be the parent ledger 126 or another parent ledger described with respect to system 100. The child ledger 128 may be one of the child ledgers 128 described with respect to system 100. Additionally, the parent ledger 126 and the child ledger 128 may have a hierarchical relationship with one another as described with respect to system 100. The parent ledger 126 may itself be a child ledger to another ledger and the child ledger 128 may itself be a parent ledger to another ledger.

The hierarchical relationship of the parent ledger 126 and the child ledger 128 may be useful for indexing the ledgers. The ledgers may be indexed based on a virtual location, a physical location, or a position (e.g., position in an area, a space, an organization, etc.). Storing ledgers in the hierarchical relationship is beneficial because data can be organized in a structured and logical manner, allowing users and systems to efficiently locate, access, and manage data. The ledger hierarchy can also provide a framework for categorizing device data, ensuring consistency, and improving efficiency of a ledger system. The hierarchy can enable improved navigation because the ledgers can be organized in a tree-like structure with ledgers and sub ledgers, making it easier to locate specific data. Further, the indexing of ledgers can help optimize storage utilization, distribution where data is stored and/or the hardware of ledgers. The hierarchical relationship can also improve access control, by enabling ledger access controls at different levels (e.g., based on NFT ownership), thereby enhancing data integrity, availability, and confidentiality. Another benefit of a hierarchical ledger system is that the structured approach can support the addition of new ledgers without disrupting the overall system. Such ledgers can be added, even if the protocols of one ledger vary from another ledgers in the hierarchical relationship because each ledger in the hierarchy is separate.

Parent ledger 126 may record tokens (e.g., NFTs, fungible tokens, composable tokens, etc.), transactions, and/or smart contracts, etc. As an example, parent ledger 126 is illustrated to include a first NFT 302*a*, a second NFT 302*b*, a first transaction 304*a*, and a first smart contract 306*a*.

The first NFT 302*a* and second NFT 302*b* may be configured to link the parent ledger 126 with the child ledger 128 and is described further with respect to FIG. 4, below. For example, the second NFT 302*b* may include a pointer to the child ledger 128 and/or an index identifying the child ledger 128. The second NFT 302*b* may represent ownership of the child ledger 128. The second NFT 302*b* may include state information associated with the child ledger 128.

State information of the child ledger 128 may represent the current status (e.g., on, off, state machine state, active, deactivated, NULL state, locked, etc.) and/or snapshot of all data stored by the child ledger 128. The snapshot may include a representation of one or more account balances, contract code, or storage data. The state may include a reflection of all the transactions and operations that have taken place up to a given point in time. The state information may be updated when the child ledger 128 records a transaction or records a block.

Child ledger 128 may record tokens, transactions, and/or smart contracts. As an example, child ledger is illustrated to include a third NFT 302*c*, a second transaction 304*b*, and a second smart contract 306*b*. Child ledger 128 may perform similar operations and include data similar to the parent ledger 126. The third NFT 302*c* may point to a child ledger of the child ledger 128. The third NFT 302*c* may point to the parent ledger 126. The third NFT 302*c* may include similar information as the second NFT 302*b*, but for the parent ledger 126 (e.g., parent ledger 126 state information).

Figure 4:
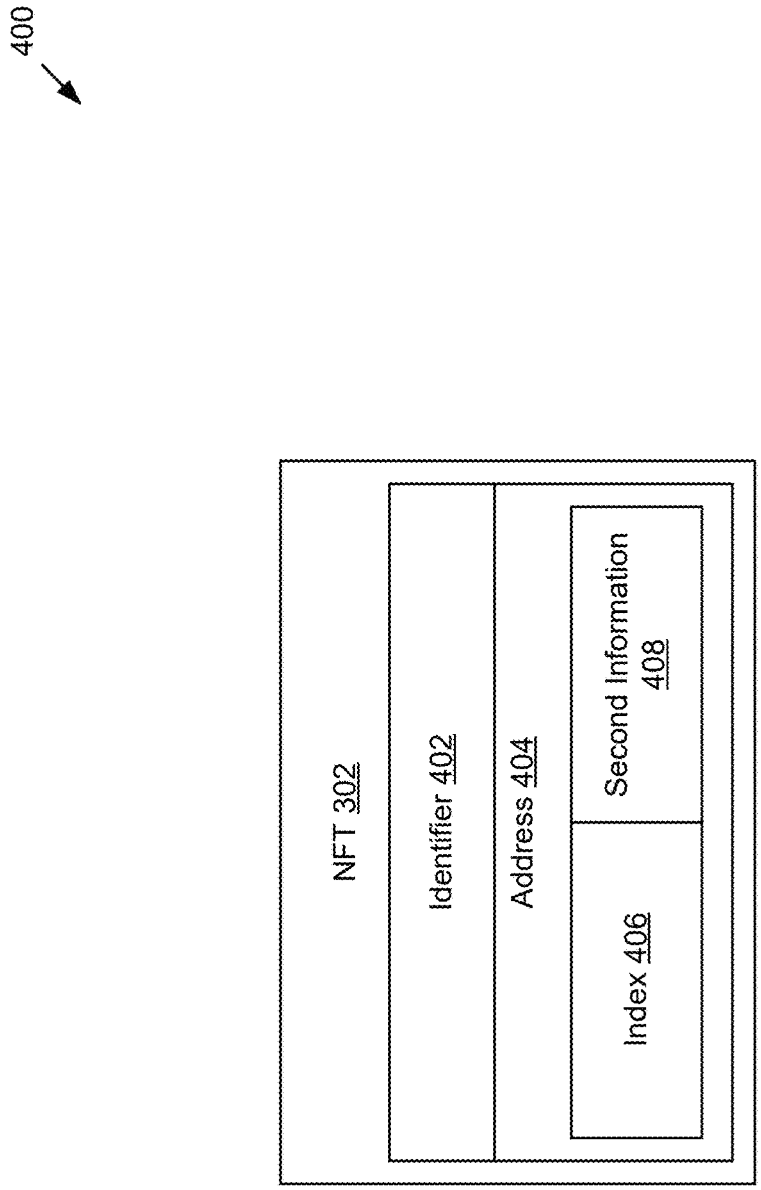
FIG. 4 illustrates a block diagram of a non-fungible token (NFT) according to according to certain embodiments, in accordance with the present disclosure.

FIG. 4 illustrates a block diagram of a non-fungible token (NFT) 302 according to according to certain embodiments, in accordance with the present disclosure. NFT 302 may be the first NFT 302*a*, second NFT 302*b*, or third NFT 302*c* as described above.

NFTs may comprise various forms of data to represent an asset. The data included within an NFT 302 may comprise an identifier 402 and/or an address 404. The identifier 402 is typically unique to the ledger that the NFT 302 is minted on. In certain embodiments, the NFT 302 identifier 402 is unique across more than one ledger. The identifier 402 may be represented with a hash value, a globally unique identifier (GUID), a universally unique identifier (UUID), a number, a name, 256-bit value, 512-bit value, etc. The identifier may correspond to a child ledger of the ledger that the NFT is recorded on. In certain embodiments, NFT identifiers may be close in value when the NFTs were generated neat a similar time. In certain embodiments, the identifier of the NFT may indicate the order in which the NFTs were minted.

In the case of a geolocation NFT, an NFT that corresponds to a location, the identifier may be similar (e.g., close in numerical value, close in alphabetical order, etc.) to identifiers of other NFTs recorded on the same ledger as the NFT when the other NFTs correspond to ledgers associated with locations that are relatively close in proximity to the location associated with the ledger corresponding to the NFT 302.

The address 404 included within NFT 302 may be of any practical length. For example, the address 404 length may be 256 bits. In certain embodiments, the address 404 represents the unique owner address (e.g., wallet address of an owner, etc.) associated with an owner of the NFT 302. The bits within the address 404 field of the NFT 302 may represent many different pieces of information or objects, limited only by the size of the bit field, possibly a unitary bit field. Thus, the inventive subject matter is considered to include extending the functionality of the NFT owner address to include ledger management features via one or more bit fields. Example techniques for managing bit fields of NFT may be adapted, as discussed below, from U.S. Pat. No. 11,880,824 to Witchey et. Al. titled "Managing Digital Blockchains via Digital Tokens, Systems, Methods, and Apparatus," filed on Apr. 6, 2023.

In certain embodiments, the address 404 field of the NFT 302 includes two or more separate fields that are less than the size of the address 404 field so that the address 404 field may represent more than one piece of information. For example, the address 404 field of the NFT 302 may include two fields. A first field of the two fields may represent an index that corresponds to a ledger in a hierarchy of ledgers. The index may be an index of a ledger that is a parent or a child to the ledger the NFT is recorded on. As described above, the ledger in a hierarchy of ledgers may correspond to a location. Accordingly, the index included in the address 404 field may correspond to the location.

A second field of the two fields may represent second information. The second information may include state information (e.g., state information of a child ledger, state information of a parent ledger, etc.). The state information may represent a change to data recorded on a ledger corresponding to the NFT and other than the ledger the NFT is recorded on. In certain embodiments, the state information is updated based on updates or edits related to a ledger the NFT is corresponding to, such as a child ledger (e.g., a block is added to the ledger, transactions are added to the ledger, the ledger is turned on or off, the ledger state changes, etc.). By changing the state information and/or other bits of the address 404 field over time, the size of transactions related to the NFT can be reduced which can enable a reduction of computational strain on a network.

The address 404 may include an owner identifier (e.g., wallet address of the owner). The owner identifier may represent a unique identifier of an owner of the NFT 302 and may not change until the owner of the NFT 302 (or, equivalently in some embodiments, the owner of the ledger pointed to by the NFT) changes. In certain embodiments, bits in the address 404 bit field may represent a URL and/or a point/file handle into a file system (e.g., local file system for the target ledger, IPFS, etc.). While the above example provides for splitting address 404 into multiple fields, it is also contemplated that a NFT may include a first address field representing one or more wallet addresses and one or more additional fields representing the index and/or the second information. In certain embodiments, the address 404 includes a bit field of a first length, and a portion of the bit field can be used to represent an address (e.g., a wallet address), a second portion can represent index 406, and a third portion can represent second information 408. The disclosed approach provides the advantage of creating greater functionality of disclosed NFTs without requiring a change to existing and established ledger or NFT infrastructure.

In certain embodiments, the complete address 404 bit field or portions of the address 404 bit field represent a pointer to a block, a transaction, data, a smart contract, an NFT, etc. on a child ledger or a parent ledger of the ledger the NFT 302 is recorded on. The pointer bit field may point directly or indirectly to an object or objects recorded on another ledger.

In certain embodiments, the address 404 of the NFT includes geolocation information (e.g., a physical address, identifier of the physical address, etc.). The geolocation information may indicate a location corresponding to the NFT. For example, the geolocation information may be represented by the NFT. The geolocation information may correspond to a ledger in the hierarchy of ledgers and at the index. The geolocation information may include an index identifying a ledger (e.g., a child ledger). In certain embodiments, the identifier of the ledger includes at least 64 bits. In certain embodiments, the identifier of the ledger includes an S2 cell identifier, which is may typically be a 64-bit identifier although other practical sizes are also contemplated.

Consider the following example embodiment of NFT 302. The NFT may be a geolocation NFT and therefore correspond to a location. The NFT may be recorded on a first ledger that corresponds to a first location, such as a parking lot, and the NFT may correspond to (i.e., represent) a second location that is a subset of and/or included in the first location, such as a parking space included in the parking lot. The first ledger the NFT is recorded on may include any number of NFTs. Any number of the NFTs recorded on the first ledger may correspond to sub locations of the location. The NFT may include an identifier of the second ledger. The NFT may include an index that indicates an index of the second ledger. The index of the NFT may be useful to determine or identify the second ledger and/or a node of the second ledger that transaction data may be transmitted to. The second NFT may include second information representing at least state information of the second ledger. The state information may indicate when a value has changed on the second ledger, a transaction has been added to the second ledger, etc.

Consider the following second example embodiment of NFT 302. The NFT may be a geolocation NFT and therefore correspond to a location. The NFT may be recorded on a first ledger that corresponds to a first location, such as a postal code, and the NFT may correspond to a second location that includes the first location, such as a state that includes the postal code. The first ledger the NFT is recorded on may include any number of NFTs. Any number of the NFTs recorded on the first ledger may correspond to parent locations of the location. The NFT may include an index identifying the second ledger. The NFT may include an index that indicates an index of the second ledger.

Consider the following third example embodiment of NFT 302. NFT 302 may correspond to a part of a URL. For example, the NFT may correspond to a ledger that records transactions related to a subdomain, a second-level domain (SDL), a top level domain (TLD), or a page path. The ledger the NFT is stored on may correspond to transactions related to a protocol, a subdomain, a SLD, or a TLD, respectively.

In certain embodiments, a number of ledgers in a ledger hierarchy may correspond to a first category and a second number of ledgers in a ledger hierarchy may correspond to a second category. For example, a first ledger may include an NFT that correspond to a location ledger and a second NFT that corresponds to a URL ledger. Accordingly, the first ledger may be included in a technique to determine an index of different categories of ledgers.

In yet another embodiment, a number of ledgers in a ledger hierarchy may correspond to a first category and a second number of ledgers in a ledger hierarchy may correspond to a second category. For example, the ledgers associated with locations may be used to drill down to a fine grained location, such as by determining a state ledger from an NFT of a country ledger, then determining a city ledger from an NFT of the state ledger, then determining a school ledger from the city ledger. Then NFTs on the city ledger may correspond to URLs owned by a school, and the school ledger can be used to determine an SDL ledger, and the SDL ledger can be used to determine a TLD ledger. Such an approach is considered advantageous because use of cross-linking ledgers via NFTs provides for faster indexing and retrieval of ledger information compared to techniques including brute force review of ledger block data. The capability for a system to perform faster indexing can reduce the computational strain on the system, allowing for less computation resources to be included in the system and/or freeing up computational resources to be used for other system processes.

The processing depicted in flow diagrams 500 and 600, and any other FIGS. may be implemented in software (e.g., code, instructions, program, etc.) executed by one or more processing units (e.g., processors, cores, etc.) of the respective systems, using hardware, or combinations thereof. The software may be stored on a non-transitory storage medium (e.g., on a memory device). The software may be stored on at least one non-transitory computer readable memory storing a plurality of notarized ledgers (e.g., where each notarized ledger is indexed by at least one corresponding geographic location index) and storing software instructions. The method presented in flow diagrams 500 and 600, and other FIGS. and described herein are intended to be illustrative and non-limiting. Although flow diagrams 500 and 600, and other FIGS, depict the various processing steps occurring in a particular sequence or order, this is not intended to be limiting. In certain alternative embodiments, the processing may be performed in some different order or some steps may also be performed in parallel. It should be appreciated that in alternative embodiments the processing depicted in flow diagrams 500 and 600, and other FIGS., may include a greater number or a lesser number of steps than those depicted in the respective FIGS.

Figure 5:
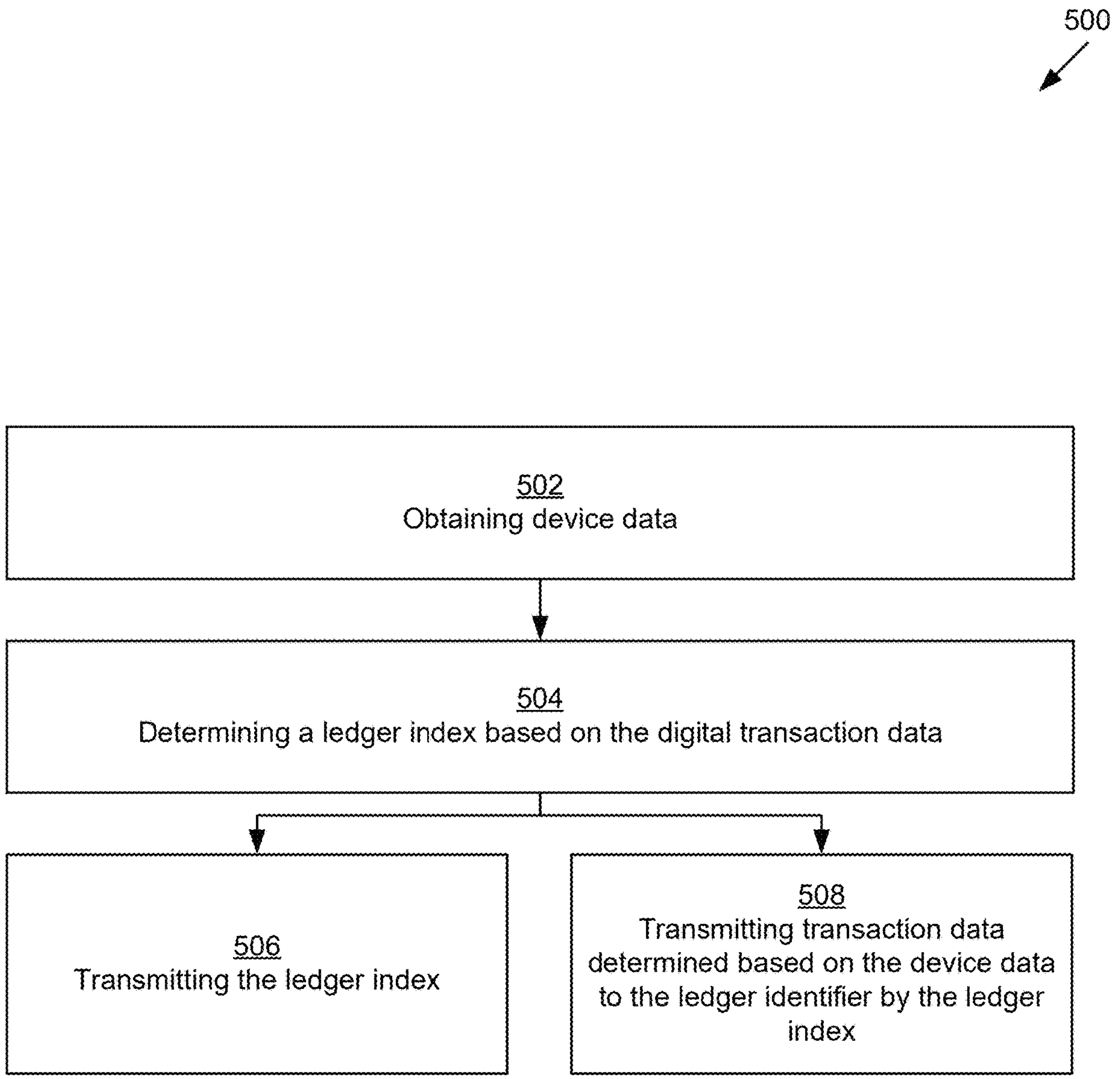
FIG. 5 shows a flow diagram illustrating a method utilized by a transaction management system according to certain embodiments, in accordance with the present disclosure.

FIG. 5 shows a flow diagram 500 illustrating a method utilized by a transaction management system according to certain embodiments, in accordance with the present disclosure. Flow diagram 500 may be performed by a computer-based transaction management system (e.g., transaction management system 120 described with respect to system 100). As mentioned above, the transaction management system may be implemented leveraging a smart contract of a ledger or may be implemented using a computer system separate from a ledger.

At 502, the transaction management system may obtain device data. The device data may be digital. The device data may be the device data 116 described above. The device data may be obtained from a device (e.g., device 112 described above). The device data may include transaction data and/or be used to determine transaction data to be recorded on one or more ledgers. The ledgers may be included in a hierarchy of ledgers.

At 504, the transaction management system may determine a ledger index (e.g., a ledger identifier). The ledger index may be part of a scheme indexing the hierarchy of ledgers. As described above, the ledger index may be determined as a function of the device data (e.g., using a hash function). In certain embodiments, the ledger index includes an address of a ledger or a node of a ledger. In certain embodiments, the ledger index can be used with a lookup table to determine an address of the ledger corresponding to the ledger index. In certain embodiments, the transaction management system determines more than one index of a ledger based on device data. For example, the device data may include data to be recorded one more than one ledger, whether the ledgers are in a parent-child relationship with one another or not.

In certain embodiments, the transaction management system may determine transaction data (e.g., transaction data 114 described above) based on the device data. In certain embodiments, the transaction data is also based on the determined ledger index. The transaction data may be transmitted at step 508.

At 506, the transaction management system may transmit the ledger index and/or ledger data corresponding to the ledger index determined at step 504. The ledger index and/or ledger data corresponding to the ledger index may be transmitted to the device that the device data was received from so that the device may transmit the device data or different device data to the ledger corresponding to the ledger index. In such embodiments, the transaction management system may serve as a lookup system (e.g., a look up table, a hash table, a tree, a trie, bitmap indexing, inverted indexing, grid indexing, a KD-tree, etc.) that the device can use to determine where to record a transaction.

At 508, the transaction management system may transmit the transaction data to a ledger identified by the ledger index determined at step 504. The transaction data may include data to be included in a transaction to be recorded on the ledger and/or a child of the ledger identified by the ledger index.

In certain embodiments, the transaction data is transmitted to the ledger identified by the ledger index and the transaction data is used to determine an NFT that corresponds to at least a portion of the transaction data, the NFT may correspond to (e.g., point to) a child ledger of the ledger identified by the index. Transaction data may then be recorded on the ledger identified by the ledger index and/or the child ledger corresponding to the NFT.

Figure 6:
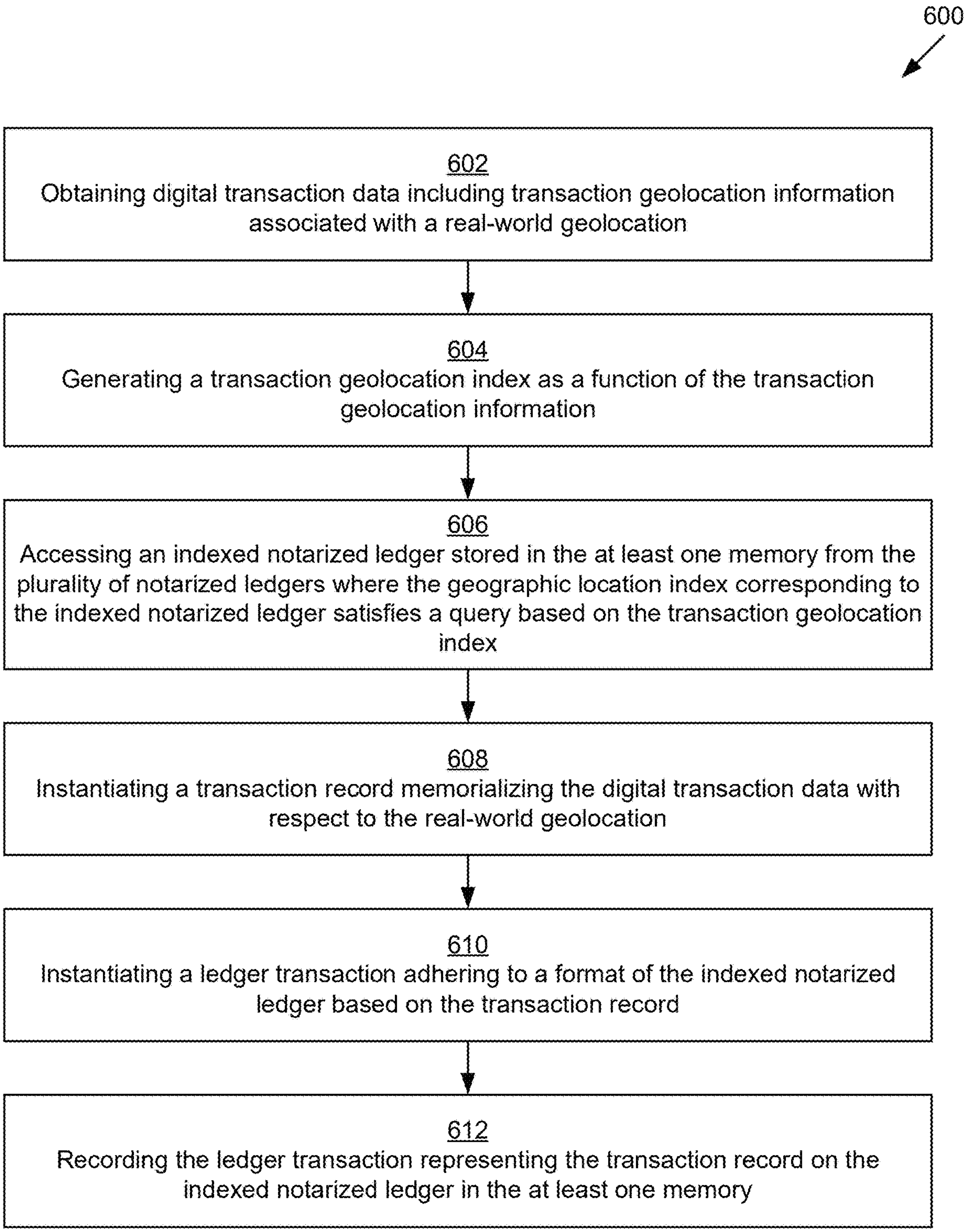
FIG. 6 shows a flow diagram illustrating a method utilized by a computer-based data indexing system according to certain embodiments, in accordance with the present disclosure.

FIG. 6 shows a flow diagram 600 illustrating a method utilized by a computer-based data indexing system according to certain embodiments, in accordance with the present disclosure. The computer-based data indexing system may include the system 100, or a portion thereof, described above.

At 602, digital transaction data may be obtained. The digital transaction data may be obtained from a device (e.g., device 112 described above). The digital transaction data may be included in device data (e.g., device data 116 described above) transmitted from the device to a transaction management system (e.g., transaction management system 120 described above).

In certain embodiments, the digital transaction data includes geolocation information associated with a real-world geolocation. The geolocation information may be associated with a real-world geolocation of the device, of a sender wallet address (e.g., based on a preconfigured association with the geolocation), and/or of a receiver wallet address (e.g., based on a preconfigured association with the geolocation), etc. In certain embodiments, the digital transaction data includes geolocation information associated with a virtual-world geolocation, such as a server, a realm, a virtual coordinate position, etc. In certain embodiments, the digital transaction data includes other location data such as a memory location, or a file path location, etc.

At 604, an index may be generated. The index may be generated by a transaction management system (e.g., transaction management system 120 described above). The index may be generated as a function of the device data. The index may correspond to a ledger. In certain embodiments, the index corresponds to more than one ledger. In certain embodiments, the index is determined based on the geolocation information included in the device data and may be referred to as a transaction geolocation index. The transaction geolocation index may identify a ledger that corresponds to the geolocation information.

At 606, an indexed notarized ledger may be accessed. The ledger accessed may correspond to the index generated at step 604. The ledger may be stored in at least one memory of a plurality of ledgers. The plurality of ledgers may include a ledger hierarchy (e.g., ledger hierarchy 124 described above). The ledger hierarchy may include at least one parent ledger and one or more child ledgers of the parent ledger.

In certain embodiments, the index generated at step 604 directly indicates a ledger to access (e.g., a ledger satisfying a query based on the index generated at step 604). An example of the direct indication may include indicating a node address of the ledger to access. In certain embodiments, the index generated at step 604 indirectly indicates the ledger to access. An example of the indirect indication may include indicating an NFT on a ledger, and the NFT includes information identifying another ledger to record a transaction, transmit the transaction data to, and/or transmit the device data to. The transaction data and/or device data may be used by the ledger indicated by the NFT to conduct a transaction and/or generate an index of another ledger (e.g., similar to steps 602-606).

At 608, a transaction record may be instantiated. The transaction record may memorialize the device data and/or the transaction data received from the transaction management system. The transaction record may memorialize transactions with respect to at least a portion of the device data (e.g., a real-world location, a virtual location, a device, organizational structure, a legal system, a corporate governance, project management, a file system, an educational system, software, products, information technology infrastructure, military structure, government structure, supply chain management, and/or a document, etc.).

At 610 a ledger transaction may be instantiated as a data object in the system's computer readable memory. The ledger transaction may be instantiated according to a format of the indexed notarized ledger accessed at step 606 and/or according to the transaction record recorded on the indexed notarized ledger. The ledger transaction may include at least a portion of the transaction data and/or the device data.

At 612, the ledger transaction instantiated at step 610 may be recorded on the indexed notarized ledger. In certain embodiments, as described herein, the transaction record may be recorded off ledger and data pointing to the transaction record may be recorded on the indexed notarized ledger.

Figure 7:
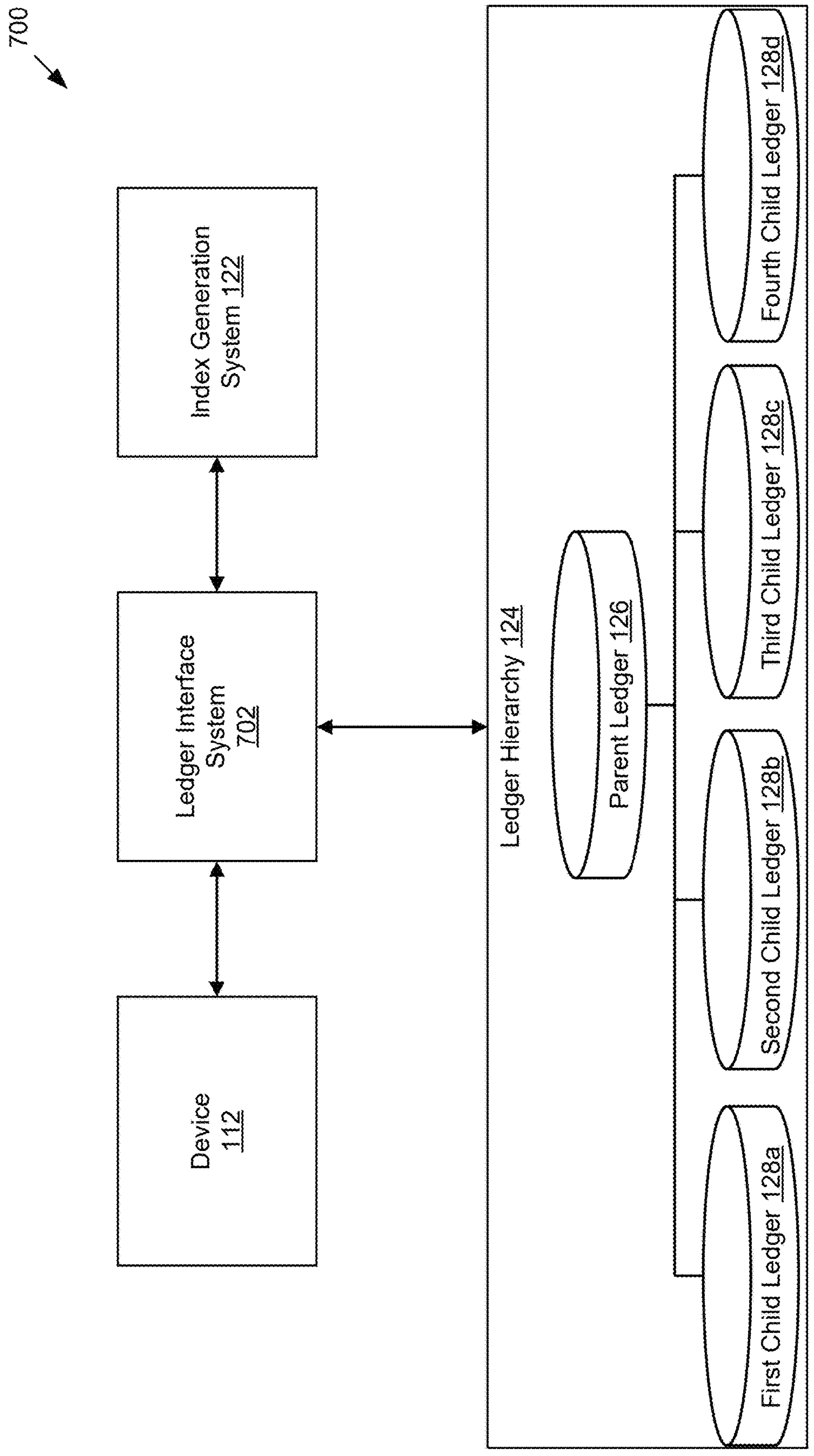
FIG. 7 illustrates a block diagram of a system for viewing blockchain data according to certain embodiments, in accordance with the present disclosure.

FIG. 7 illustrates a block diagram of a system 700 for viewing blockchain data according to certain embodiments, in accordance with the present disclosure. The system 700 may include a device 112 (e.g., device 112 described above), a ledger interface system 702, an index generation system 122 (index generation system 122 described above), and a ledger hierarchy 124 (e.g., the ledger hierarchy 124 described above). In certain embodiments, the ledger interface system 702 is local to the device 112 (e.g., executing on the device 112).

The device 112 may communicate with the ledger interface system 702 (e.g., using a network connection such as network 118 described above). The ledger interface system 702 may be configured to perform ledger browsing functions. The ledger interface system 702 may be configured to read ledgers from the ledger hierarchy 124. In certain embodiments, the ledger interface system 702 can be used to record transactions on a ledger included in the ledger hierarchy 124.

In certain embodiments the ledger interface system 702 may transmit information included on parent ledger 126. The parent ledger may include transactions, smart contracts, and/or NFTs, etc. The ledger interface system 702 may transmit the parent ledger 126 information to the device 112 and the device 112 may present the information (e.g., using a user interface). In certain embodiments, the information from the parent ledger 126 includes as least a portion of the information represented on one or more child ledgers (e.g., first child ledger 128*a*, second child ledger 128*b*, third child ledger 128*c*, fourth child ledger 128*d*, etc.). In certain embodiments, the information from the parent ledger 126 includes a summary (e.g., state information) of the information included on the child ledger 128. The information from the parent ledger 126 may include data included in an NFT (e.g., an address 404, an identifier 402, an index 406, second information 408, etc.).

The ledger interface system 702 may receive an indication from the device 112 to present information included on a child ledger 128. For example, a user interface of the device 112 (e.g., a mouse) may receive an indication that information on the first child ledger 128*a* should be presented on a second user interface (e.g., a display) of the device 112. The ledger interface system 702 may determine an index corresponding with the first child ledger 128*a* (e.g., based on data included in an NFT, based on location data of the device 112, based on input received from an interface of the device 112, etc.) and query the first child ledger 128*a* based on the index.

Determining an index of the first child ledger 128*a* may be performed using the index generation system 122. The index generation system 122 may generate an index based on device data. The index generation system 122 may generate an index based on a search criteria received from the device 112. The search criteria may include a location.

The index of the first child ledger 128*a* may enable the ledger interface system 702 to read information recorded on the first child ledger 128*a* and transmit the information recorded on the first child ledger 128*a* to the device 112 for presentation. The information may be presented and interacted with in a similar manner as described above with respect to presenting information recorded on the parent ledger 126.

Figure 8:
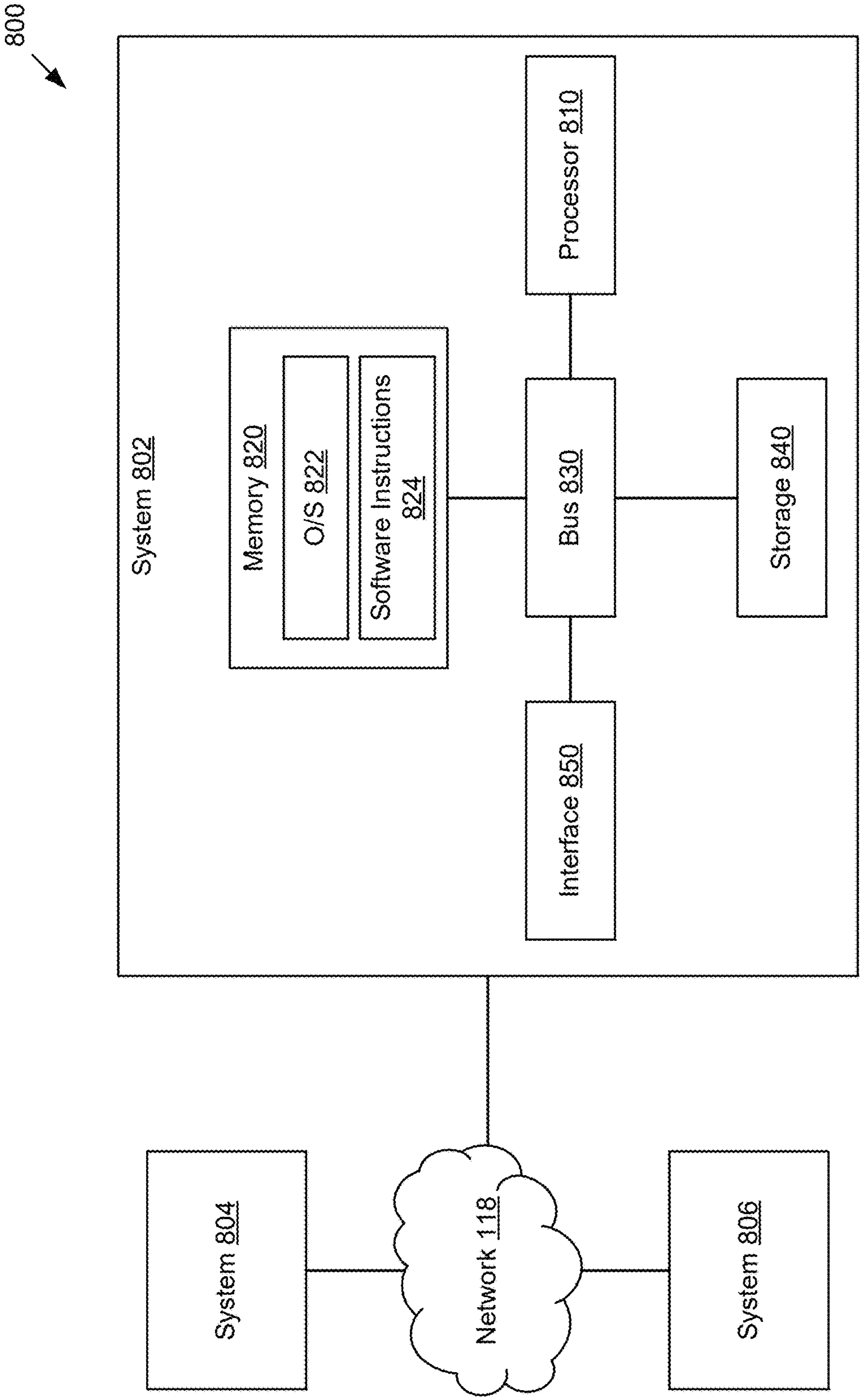
FIG. 8 is a block diagram of a distributed computer system usable to implement embodiments of the present disclosure.

FIG. 8 is a block diagram of a computer system 800, possibly a distributed computing system, usable to implement embodiments of the present disclosure. Various aspects and functions described herein may be implemented as hardware, software executing on hardware, or a combination of hardware and software executing on one or more computer systems. Aspects in accordance with the present disclosure may be located on a single computer system or may be distributed among one or more computer systems connected to one or more communication networks.

For example, various aspects and functions may be distributed among one or more computer systems configured to provide a service to one or more client computers, or to perform an overall task as part of a distributed system. Additionally, aspects may be performed on a client-server system, peer-to-peer system, or multi-tier system that includes components distributed among one or more server systems that perform various functions.

The distributed computer system 800 of FIG. 8 includes three computer systems 802, 804, and 806 (although a different number of computer systems is possible). The computer systems 802, 804, and 806 can be operated by different entities and/or can be computing nodes of a notarized ledger system (e.g., a blockchain network, a hashgraph network, etc.). As shown, the computer systems 802, 804, and 806 are interconnected by, and may exchange data through, a communication network 118 (e.g., network 119 described with respect to FIG. 1). The network 118 may include any communication network through which computer systems may exchange data. To exchange data via the network 118, the computer systems 802, 804, and 806 and the network 118 may use various methods, protocols, and standards including, among others, token ring, Ethernet, Wireless Ethernet, Bluetooth, NFC, TCP/IP, UDP, HTTP, FTP, SNMP, SMS, MMS, SS7, JSON, XML, REST, SOAP, CORBA IIOP, RMI, DCOM, and Web Services. The communication network 118 may further employ one or more mobile access technologies including 2nd (2 G), 3rd (3G), 4th (4G), 5th (5G) generation radio access for cellular systems, WLAN, Wireless Router (WR) mesh, and other communication technologies. Access technologies such as 2G, 3G, 4G, LTE, and future access networks may enable wide area coverage for mobile devices.

Computer systems 802, 804, and 806 may include clients and servers. In various embodiments, to ensure data transfer is secure, the computer systems 802, 804, and 806 may transmit data via the network 118 using a variety of security measures including TSL, SSL, or VPN, among other security techniques.

Various aspects and functions may be implemented as specialized hardware or software executing in one or more computer systems including the computer system 802 shown in FIG. 8. As depicted, the computer system 802 includes a processor 810, a memory 820, a bus 830, an interface 850, and a storage system 840. The processor 810, which may include one or more microprocessors or other types of controllers, can perform a series of instructions that manipulate data. As shown, the processor 810 is connected to other system placements, including a memory 820, by the bus 830.

The memory 820 may be used for storing programs and data during operation of the computer system 802. Memory 820 may include at least a storage area network (SAN), a network area storage (NAS) system, a distributed storage system, a cloud-base storage system, a file system, a distributed file system, and/or a torrent.

The memory 820 may be a relatively high performance, volatile, random access memory such as a dynamic random access memory (DRAM) or static memory (SRAM). However, the memory 820 may include any device or combination of devices (e.g., multiple distinct memories) for storing data, such as a disk drive or other non-volatile storage device, such as flash memory or phase-change memory (PCM). Various embodiments in accord with the present disclosure can organize the memory 820 into particularized and, in some cases, unique structures to perform the aspects and functions disclosed herein. The memory 820 may store program code of an operating system 822 and software instructions 824 for a TMP.

Components of the computer system 802 may be coupled by an interconnection element such as the bus 830. The bus 830 may include one or more physical busses (for example, busses between components that are integrated within a same machine) and may include any communication coupling between system placements including specialized or standard computing bus technologies such as IDE, SCSI, PCI, and InfiniBand. Thus, the bus 830 enables communications (for example, data and instructions) to be exchanged between system components of the computer system 802.

Computer system 802 also includes one or more interfaces 850 such as input devices, output devices and combination input/output devices. The interface 850 may receive input, provide output, or both. For example, output devices may render information for external presentation. Input devices may accept information from external sources. Examples of interface devices include, among others, keyboards, mouse devices, trackballs, microphones, touch screens, printing devices, display screens, speakers, network interface cards, etc. The interface 850 allow the computer system 802 to exchange information and communicate with external entities, such as users and other systems.

Storage system 840 may include a computer-readable and computer-writeable nonvolatile storage medium in which instructions are stored that define a program to be executed by the processor. The storage system 840 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. A medium that can be used with various embodiments may include, for example, optical disk, magnetic disk, or flash memory, among others. In operation, the processor 810 or some other controller may cause data to be read from the nonvolatile recording medium into another memory, such as the memory 820, that allows for faster access to the information by the processor 810 than does the storage medium included in the storage system 840. The memory may be located in the storage system 840 or in the memory 820. The processor 810 may manipulate the data within the memory 820, and then copy the data to the medium associated with the storage system 840 after processing is completed. A variety of components may manage data movement between the medium and the memory 820, and the disclosure is not limited thereto.

Further, embodiments of the present disclosure are not limited to a particular memory system or storage system. Although the computer system 802 is shown by way of example as one type of computer system upon which various aspects and functions in accord with the present disclosure may be practiced, aspects of the disclosure are not limited to being implemented on the computer system. Various aspects and functions in accord with the present disclosure may be practiced on one or more computers having different architectures or components than that shown in FIG. 8. For instance, the computer system 802 may include specially-programmed, special-purpose hardware, such as for example, an application-specific integrated circuit (ASIC) tailored to perform a particular operation disclosed herein. Another embodiment may perform the same function using several general-purpose computing devices running the operating system 822.

The operating system 822 may manage at least a portion of the hardware placements included in computer system 802. A processor or controller, such as processor 810, may execute an operating system which may be, among others, a Windows-based operating system (for example, Windows NT, Windows 2000/ME, Windows XP, Windows 7, Windows 8, Windows 10, Windows 100, or Windows Vista) available from the Microsoft Corporation, a MAC OS System X operating system available from Apple Computer, one of many Linux-based operating system distributions (for example, the Enterprise Linux operating system available from Red Hat Inc.), a Solaris operating system available from Sun Microsystems, or a UNIX operating systems available from various sources. Many other operating systems may be used, and embodiments are not limited to any particular operating system.

In various embodiments, processor 810 and operating system 822 together define a computing platform for which application programs in high-level programming languages may be written. These component applications may be executable, intermediate (for example, C# or JAVA byte-code) or interpreted code which communicate over a communication network (for example, the Internet) using a communication protocol (for example, TCP/IP). Similarly, functions in accord with aspects of the present disclosure may be implemented using an object-oriented programming language, such as Python, JAVA, C++, C#(C-Sharp), Solidity, or Vyper, among others. Other object-oriented programming languages may also be used. Alternatively, procedural, scripting, or logical programming languages may be used.

Additionally, various functions in accord with aspects of the present disclosure may be implemented in a non-programmed environment (for example, documents created in HTML, XML or other format that, when viewed in a window of a browser program, render aspects of a graphical-user interface or perform other functions). Further, various embodiments of the present disclosure may be implemented as programmed or non-programmed placements, or any combination thereof.

Although many embodiments herein describe examples with respect to location based hierarchies, other embodiments described make clear that embodiments are not limited to location based ledger hierarchies. The methods and systems described in the present disclosure support multiple use cases. Below are some further illustrative non-limiting use cases.

In one use case, location based ledgers may be used to track crop rotations on farms. Crop data may be recorded on a ledger corresponding to a portion of a field the crops are planted on. The portions of a field may be children ledgers of a field ledger in a set of field ledgers. The field ledger may be the child of a county ledger in a set of county ledgers. The ledgers may track crop rotations at varying levels of specificity. For example, the field ledger may track the types of crops (e.g., corn, soybean, etc.) included in the field over time, while the ledgers for portions of the field may track fine grain details about the plants, such as when they were planted, watered, fertilized, etc.

In an example use case, when a wallet address associated with a device is within a physical area corresponding to a parent ledger for an amount of time, the wallet address may obtain cryptocurrency recorded on the parent ledger as a function of the time the device is within the physical area. In certain embodiments, an NFT is minted when the device enters the physical area associated with the parent ledger and the NFT may be burned when the device leaves (e.g., within 30 seconds after, one day after, etc.) the physical area associated with the parent ledger. In certain embodiments, when transaction data is recorded on a ledger, a smart contract on the ledger or a system monitoring ledger transactions may cause a notification to be transmitted. For example, the notification may be capable of indicating when a device has entered a physical area or left a physical area. The notifications may be capable of determining a direction of travel based on a location left and a location entered and/or a time spent at a location.

In certain embodiments, a first wallet address associated with a device and a first ledger may not be enabled to record a transaction to the first ledger or read a transaction from the first ledger if a second ledger associated with a second wallet address associated with the device was not first recorded to, or if an NFT is not in the second wallet (e.g., the NFT may act as an access control mechanism).

In certain embodiments, more than one ledger may correspond to a same physical area. Determining which ledger to record a transaction on may be determined based on device data and an index generation function. For example, a first ledger may represent transactions recorded by a pretzel shop in a shopping mall. The shopping mall may be represented by a second ledger. A third ledger may represent transactions recorded by an ice cream shop. The ice cream shop may have replaced the pretzel shop at the same location in the shopping mall and therefore the third ledger may have been generated after the first ledger and the first ledger may have been maintained for record keeping purposes. The first ledger may have a first owner and the third ledger may have a second owner. The ownership of the first ledger and third ledger may be identifier by an NFT on the second ledger. The capability to record transactions on and/or read transactions from the third ledger may be granted to the owner of the NFT and/or an owner of the second ledger.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, utilized, or combined with other elements, components, or steps that are not expressly referenced. Where the specification or claims refer to at least one of something selected from the group consisting of A, B, C . . . and N, the text should be interpreted as requiring only one element from the group, not A plus N, or B plus N, etc.

What is claimed is:

1. A computer-based system, comprising:
- one or more non-transitory computer readable storage media storing instructions;
- one or more processors coupled with the one or more storage media and configured to execute the instructions to cause the system to perform operations comprising:
  - receiving, from a device at a first physical location, device data associated with an asset, the device data comprising information about the first physical location;
  - determining a first index corresponding to the first physical location and based at least in part on the device data;
  - identifying a first indexed notarized ledger from a plurality of indexed notarized ledgers, each indexed notarized ledger corresponding to a location and based at least in part on the first index;
  - instantiating a transaction data object associated with the asset, the transaction data object including information specifying the first physical location of the device when the device data was received;
  - generating a first record associated with the asset and the transaction data object based at least in part on the device data; and
  - causing a transaction to be recorded representing the first record on the first indexed notarized ledger.

2. The computer-based system of claim 1, wherein the operations further comprise:
- determining a second index based at least in part on the device data, wherein the second index is generated using a function to determine the first index;
- identifying a second indexed notarized ledger from the plurality of indexed notarized ledgers based at least in part on the second index;
- generating a second record based at least in part on the device data; and
- causing a second transaction to be recorded representing the second record on the second indexed notarized ledger.

3. The computer-based system of claim 1, wherein the first indexed notarized ledger records an indication of an event occurrence at a location, and wherein the device data includes the indication of the event occurrence.

4. The computer-based system of claim 1, wherein the plurality of indexed notarized ledgers are organized as a hierarchy, the hierarchy characterized by the first indexed notarized ledger having a parent-child relationship with a second indexed notarized ledger included in the plurality of indexed notarized ledgers.

5. The computer-based system of claim 1, wherein the first physical location includes at least one of: a physical position, a physical area, or a physical building; and wherein the first index is determined based at least in part on the location.

6. The computer-based system of claim 1, wherein the first record includes at least one of: a timestamp, a device identifier of the device, the information about the first physical location, or information about the asset.

7. The computer-based system of claim 1, wherein the first index is determined based at least in part on a time, and wherein determining the first index comprises:
- generating the first index; or
- deriving the first index.

8. The computer-based system of claim 1, wherein the first index is determined based at least in part on a wallet address associated with the device.

9. The computer-based system of claim 1, wherein the device data includes optical data received by the device and wherein the first index is generated based at least in part on the optical data.

10. The computer-based system of claim 1, wherein the asset includes a physical asset.

11. The computer-based system of claim 1, wherein:
- the information about the first physical location comprises latitude and longitude of the device; and
- determining the first index comprises:
  - generating an S2 cell identifier based at least in part on the latitude and longitude of the device; and
  - identifying the first indexed notarized ledger based on the S2 cell identifier.

12. A computer implemented method including:
- receiving, via at least one processor and from a device at a first physical location, device data associated with an asset, the device data comprising information about the first physical location;
- determining, via the at least one processor, a first index corresponding to the first physical location and based at least in part on the device data;

identifying, via the at least one processor, a first indexed notarized ledger from a plurality of indexed notarized ledgers, each indexed notarized ledger corresponding to a location and based at least in part on the first index;

instantiating, via the at least one processor, a transaction data object associated with the asset, the transaction data object including information specifying the first physical location of the device when the device data was received generating, via the at least one processor, a first record associated with the asset and the transaction data object based at least in part on the device data; and recording, via the at least one processor, a transaction representing the first record on the first indexed notarized ledger.

13. The method of claim 12, wherein the device data includes an indication of the asset.

14. The method of claim 13, wherein the first index is determined based at least in part on the indication of the asset.

15. The method of claim 12, further comprising generating the first index based at least in part on a time.

16. The method of claim 15, wherein the device data includes an indication of the time.

17. The method of claim 12, wherein the device data further includes a location of a party to the transaction and wherein determining the first index is based at least in part on the location of the party to the transaction.

18. The method of claim 12, wherein the first indexed notarized ledger records a pointer to a second indexed notarized ledger included in the plurality of indexed notarized ledgers.

19. The method of claim 12, further comprising implementing a multi-factor authentication for accessing the first indexed notarized ledger included in the plurality of indexed notarized ledgers, wherein at least one authentication factor comprises verification that the device is currently located within a geographic area corresponding to the first indexed notarized ledger.

20. The method of claim 12, wherein the plurality of indexed notarized ledgers includes at least two indexed notarized ledgers of different types, and wherein the at least two indexed notarized ledgers are configured according to different protocols.

* * * * *